(12) United States Patent
Shibuya

(10) Patent No.: US 9,726,835 B2
(45) Date of Patent: Aug. 8, 2017

(54) OPTICAL RECEPTACLE AND OPTICAL MODULE

(71) Applicant: Enplas Corporation, Saitama (JP)

(72) Inventor: Kazutaka Shibuya, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 15/126,846

(22) PCT Filed: Mar. 13, 2015

(86) PCT No.: PCT/JP2015/057585
§ 371 (c)(1),
(2) Date: Sep. 16, 2016

(87) PCT Pub. No.: WO2015/141600
PCT Pub. Date: Sep. 24, 2015

(65) Prior Publication Data
US 2017/0097477 A1    Apr. 6, 2017

(30) Foreign Application Priority Data
Mar. 18, 2014  (JP) .................. 2014-055592

(51) Int. Cl.
*G02B 6/42* (2006.01)

(52) U.S. Cl.
CPC ......... *G02B 6/4208* (2013.01); *G02B 6/4206* (2013.01); *G02B 6/4214* (2013.01); *G02B 6/4286* (2013.01)

(58) Field of Classification Search
CPC .. G02B 6/4206; G02B 6/0023; G02B 6/4208; G02B 6/4214; G02B 6/4244; G02B 6/4246; G02B 6/4257; G02B 6/4286
See application file for complete search history.

(56) References Cited

U.S. PATENT DOCUMENTS

2003/0020986 A1*  1/2003  Pang ................... G02B 6/4201
                                                                        398/139
2014/0328558 A1   11/2014  Morioka et al.
(Continued)

FOREIGN PATENT DOCUMENTS

| CN | 1704780 A | 12/2005 |
|---|---|---|
| JP | 2000-028850 A | 1/2000 |
| JP | 2013-137507 A | 7/2013 |

OTHER PUBLICATIONS

International Search Report from International Application No. PCT/JP2015/057585 dated May 19, 2015.

*Primary Examiner* — Thomas A Hollweg
*Assistant Examiner* — Mary A El Shammaa
(74) *Attorney, Agent, or Firm* — Brundidge & Stanger, P.C.

(57) ABSTRACT

This optical receptacle has the following: a first surface that includes a first optical surface and a third optical surface; a reflective surface whereby the light inputted via the first optical surface is reflected in a direction parallel to a substrate; an optical separation unit whereby the light reflected off the reflective surface is separated into monitoring light and signal light; a transmitting surface through which the signal light separated out by the optical separation unit is transmitted; a third surface that includes a second optical surface via which the signal light that has been transmitted through the transmitting surface is outputted towards the end face of the aforementioned light-transporting body; and a reflected-monitoring-light avoidance means whereby monitoring light that has reached the detection element is guide so as not to return to the abovementioned light-emitting element.

6 Claims, 31 Drawing Sheets

(56) References Cited

U.S. PATENT DOCUMENTS

2015/0268425 A1\* 9/2015 de Jong ............... G02B 6/4214
                                                          385/33
2017/0059394 A1\* 3/2017 Ho ........................ G01J 1/0271

\* cited by examiner (a)

OPTICAL RECEPTACLE AND OPTICAL MODULE

TECHNICAL FIELD

The present invention relates to an optical receptacle for optically coupling a light emitting element with an end surface of an optical transmission member, and an optical module having the optical receptacle.

BACKGROUND ART

Conventionally, in optical communications using an optical transmission member such as an optical fiber and an optical waveguide, an optical module including a light emitting element such as a surface-emitting laser (for example, VCSEL: Vertical Cavity Surface Emitting Laser) has been used.

In such an optical module, an optical module component called an optical receptacle is used. The optical receptacle is used for light transmission via an optical fiber in such a manner that light containing communication information from a light emitting element is coupled to an end surface of the optical fiber.

In view of the use for photoelectric conversion devices of substrate mounting type, the Applicant has proposed an optical receptacle and an optical module having the optical receptacle which have a reflecting surface for reflecting a part of emission light emitted by a light emitting element to the detection device side as monitor light, and can simply and properly achieve light transmission in which the light of the light emitting element is taken out along the substrate direction at an end surface of the optical fiber (see PTL 1).

CITATION LIST

Patent Literature

PTL 1
Japanese Patent Application Laid-Open No. 2013-137507

SUMMARY OF INVENTION

Technical Problem

In the above-described optical module disclosed in PTL 1, it is desired to further increase the optical property by preventing reflection light from the detection device from returning to the light emitting element.

An object of the present invention is to provide an optical receptacle and an optical module including the optical receptacle which provide a further improved optical property while maintaining the conventional optical property by preventing reflection light from the detection device from returning to the light emitting element.

Solution to Problem

To solve the above-described object, an optical receptacle according to the embodiments of the present invention is disposed between a photoelectric conversion device and an optical transmission member, the photoelectric conversion device including a light emitting element and a detection device configured to detect monitor light for monitoring light emitted from the light emitting element, the light emitting element and the detection device being mounted on a substrate, the optical receptacle being configured to optically couple the light emitting element and an end surface of the optical transmission member, the optical receptacle including: a first surface including a first optical surface on which light emitted from the light emitting element is incident, and a third optical surface configured to emit the monitor light toward the detection device; a reflecting surface configured to reflect light incident on the first optical surface in a direction along the substrate; a light separation part composed of a part of an internal surface of a recess disposed on a light path of light reflected by the reflecting surface, the light separation part being configured to separate the light reflected by the reflecting surface into the monitor light directed toward the third optical surface and signal light directed toward the end surface of the optical transmission member; a transmission surface composed of a part of the internal surface of the recess, and configured to allow the signal light separated by the light separation part to pass therethrough through an internal space of the recess; a third surface including a second optical surface configured to emit the signal light passed through the transmission surface toward the end surface of the optical transmission member; and a reflection monitor light avoiding part disposed on a light path between the light separation part and the detection device, and configured to guide reflection monitor light such that the reflection monitor light does not return to the light emitting element, the reflection monitor light being the monitor light which reaches the detection device and is reflected by a detection surface of the detection device. The light separation part includes: a division reflection surface on which a part of light emitted from the light emitting element and reflected by the reflecting surface is incident, the division reflection surface being divided in a predetermined dividing direction at predetermined intervals and disposed at a second inclination angle to the first surface angle, the division reflection surface being configured to reflect the part of the light incident on the division reflection surface as the monitor light; and a division transmission surface on which another part of the light of the light emitting element reflected by the reflecting surface is incident, the division transmission surface is disposed and divided at a position where the division reflection surface is not provided, the division transmission surface being configured to allow the other part of the light incident on the division transmission surface to pass therethrough toward the third surface side as the signal light.

In addition, an optical module according to the embodiments of the present invention includes: a photoelectric conversion device including a light emitting element and a detection device configured to detect monitor light for monitoring light emitted from the light emitting element, the light emitting element and the detection device being mounted on a substrate; and the above-mentioned optical receptacle disposed on the substrate.

Advantageous Effects of Invention

According to the present invention, the light emitted from the light emitting element and reflected by the detection surface of the detection device does not return to the light emitting element, and thus the optical property of the optical module can be further improved. In addition, the present invention can simply and properly achieve light transmission performed with monitoring in which the light emitted from the light emitting element is taken out in the direction along the substrate at an end surface of the optical transmission member.

DESCRIPTION OF EMBODIMENTS

In the following, with reference to the accompanying drawings, an optical receptacle and an optical module including the optical receptacle according to the embodiments of the present invention will be described.

[Embodiment 1]

Figure 1:
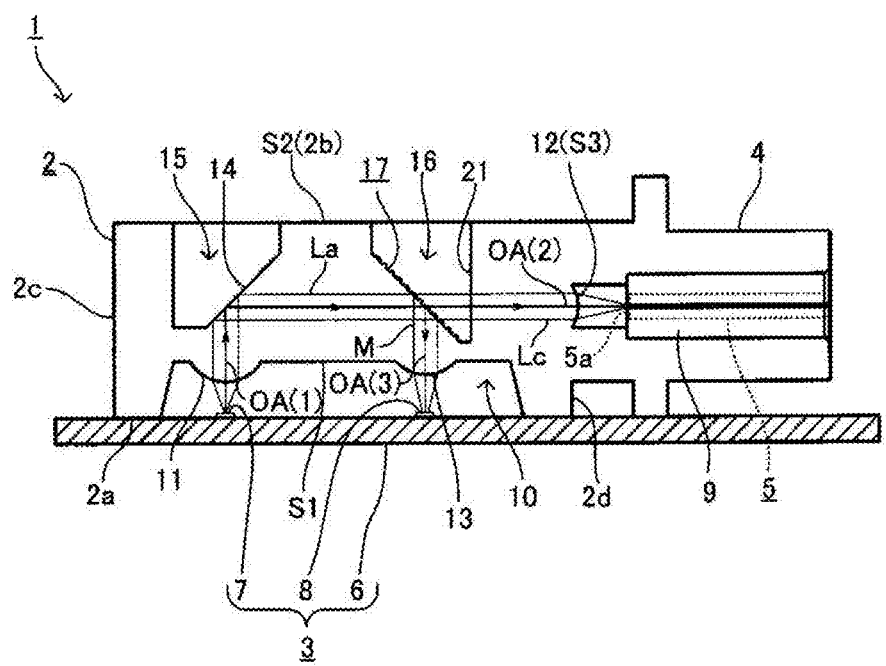
FIG. 1 is a sectional view illustrating a configuration of an optical module according to Embodiment 1 of the present invention.
Figure 2:
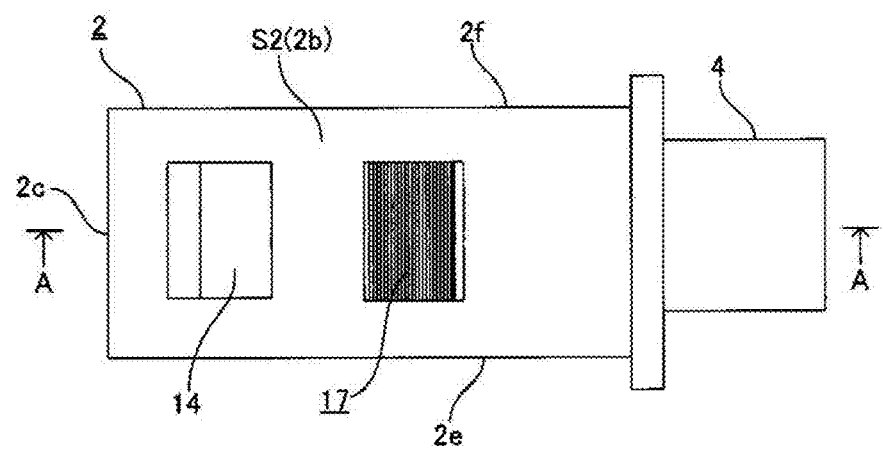
FIG. 2 is a plan view of an optical receptacle according to Embodiment 1.
Figure 3:
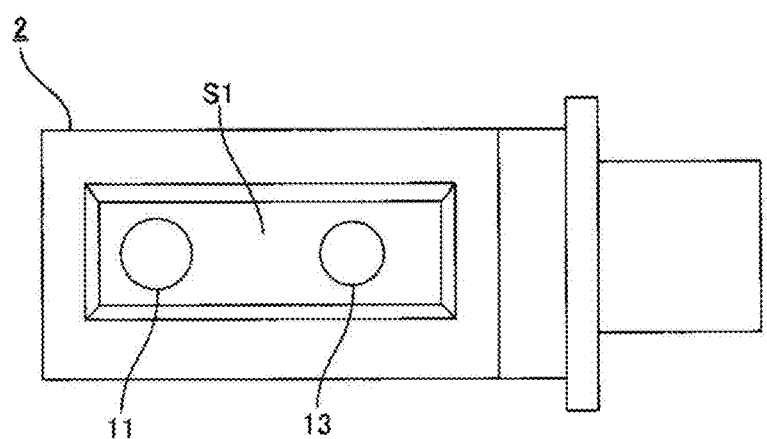
FIG. 3 is a bottom view of the optical receptacle according to Embodiment 1.

FIG. 1 is a sectional view illustrating a configuration of optical module 1 according to Embodiment 1 (which corresponds to a sectional view taken along line A-A of FIG. 2). FIG. 2 is a plan view of optical receptacle 2. FIG. 3 is a bottom view of optical receptacle 2.

As illustrated in FIG. 1, optical receptacle 2 according to Embodiment 1 (optical receptacle main body) is disposed between photoelectric conversion device 3 and optical transmission member 5.

Photoelectric conversion device 3 is a photoelectric conversion device of a substrate mounting type. Photoelectric conversion device 3 includes semiconductor substrate (circuit board) 6, light emitting element 7 and detection device 8. Semiconductor substrate (circuit board) 6 is parallel to lower end surface 2a of optical receptacle 2. On the surface (top surface) of semiconductor substrate (circuit board) 6 on optical receptacle 2 side, one light emitting element 7 configured to emit (light emission) laser light La in a direction (upward direction) perpendicular to the surface is disposed. Light emitting element 7 is, for example, a vertical cavity surface emitting laser (VCSEL). In addition, at a position on the surface of semiconductor substrate 6 on optical receptacle 2 side and on the right side relative to light emitting element 7 in FIG. 1, one detection device 8 configured to receive monitor light M for monitoring the output (such as intensity and quantity) of laser light La emitted from light emitting element 7 is disposed. Detection device 8 is a photodetector, for example. Further, although not illustrated in the drawing, an electronic component such as a circuit configured to control the output of laser light La emitted (light emission) from light emitting element 7 based on the intensity and the quantity of monitor light M detected by detection device 8 is mounted on the surface of semiconductor substrate 6 on optical receptacle 2 side. The electronic component is electrically connected with light emitting element 7 and detection device 8 through a wiring. Photoelectric conversion device 3 is attached to optical receptacle 2 with a publicly known fixing member such as adhesive agent (such as thermosetting resin and ultraviolet curing resin) provided between semiconductor substrate 6 and optical receptacle 2, for example.

Optical transmission member 5 is an optical fiber, an optical waveguide or the like, for example. In the present embodiment, optical transmission member 5 is an optical fiber. In addition, optical transmission member 5 may be a single mode optical fiber, or a multiple mode optical fiber. A portion having a predetermined length of optical transmission member 5 on end surface 5a side is detachably attached in cylindrical optical transmission member attaching portion 4 formed in optical receptacle 2 together with cylindrical ferrule 9 which holds the portion. In the state where ferrule 9 holding optical transmission member 5 is attached to optical receptacle 2, a portion of optical transmission member 5 on end surface 5a side (a portion housed in optical transmission member attaching portion 4) is parallel to semiconductor substrate 6.

In the state where optical receptacle 2 is disposed between photoelectric conversion device 3 and optical transmission member 5, optical receptacle 2 optically couples light emitting element 7 and end surface 5a of optical transmission member 5. Optical receptacle 2 includes first surface S1, reflecting surface 14, light separation part 17, third surface S3, and a reflection monitor light avoiding part.

As illustrated in FIG. 1, in optical receptacle 2, the external shape of the principal part having various kinds of optical surfaces is formed in a substantially cuboid shape. That is, as illustrated in FIG. 1 to FIG. 3, in the principal part of optical receptacle 2, the rough external shape is defined by lower end surface 2a, upper end surface 2b, left end surface 2c, right end surface 2d, front end surface 2e and rear end surface 2f. In addition, upper and lower end surfaces 2a and 2b are parallel to each other, and left and right end surfaces 2c and 2d are also parallel to each other. Further, upper and lower end surfaces 2a and 2b, and left and right end surfaces 2c and 2d are perpendicular to each other. It is to be noted that optical transmission member attaching portion 4 described above is formed to protrude to the right side from right end surface 2d. It should be noted that the present invention is not limited to this configuration, and in the case where optical receptacle 2 is produced by resin molding for example, a releasing taper for the release from the metal mold may be formed at left and right end surfaces 2c and 2d.

As illustrated in FIG. 1, on lower end surface 2a of optical receptacle 2, first recess 10 opening at lower end surface 2a and having a substantially trapezoidal cross-sectional shape is formed. In addition, the bottom surface of first recess 10 is first surface S1 including first optical surface 11 on which laser light La emitted from light emitting element 7 is incident and third optical surface 13 from which monitor light M directed toward detection device 8 is emitted. As illustrated in FIG. 1, first surface S1 is parallel to lower end surface 2a. As illustrated in FIG. 1 and FIG. 3, one first optical surface 11 is formed in a region around a left end portion on first surface S1 in FIG. 1 and FIG. 3. As illustrated in FIG. 1 and FIG. 3, first optical surface 11 is a spherical or aspherical convex lens surface having a circular shape in plan view and projecting toward light emitting element 7 side. Preferably, first optical axis (central axis) OA (1) on optical surface 11 is aligned with the central axis of (central light beam) laser light La emitted from light emitting element 7 (light flux). In addition, the axis direction of optical axis OA (1) may be perpendicular to first surface S1.

As illustrated in FIG. 1, in the state where photoelectric conversion device 3 is attached to optical receptacle 2, laser light La emitted from light emitting element 7 is incident on first optical surface 11 from below. Laser light La incident on first optical surface 11 becomes collimate light and advances in optical receptacle 2.

In addition, as illustrated in FIG. 1 and FIG. 2, upper end surface 2b of optical receptacle 2 is a second surface S2 disposed on the side opposite to first surface S1 (the upper side in FIG. 1). At a position of second surface S2 on the travelling direction side of laser light La relative to first optical surface 11 (at a position just above first optical surface 11 in FIG. 1), reflecting surface 14 is formed such that reflecting surface 14 is tilted to the right side toward the upper side (or such that the distance to optical transmission member attaching portion 4 decreases toward upper end surface 2b side from lower end surface 2a side of optical receptacle 2) at a predetermined first inclination angle relative to first surface S1. As illustrated in FIG. 1, reflecting surface 14 is composed only of an inclined surface of second recess 15 of a substantially trapezoidal cross-sectional shape which is formed downward on second surface S2.

As illustrated in FIG. 1, laser light La which is emitted from light emitting element 7 and is incident on first optical surface 11 is incident (internally incident) on reflecting surface 14 from the internal side of optical receptacle 2 at an incident angle greater than the critical angle from below in FIG. 1. Then, reflecting surface 14 totally reflects laser light La toward the right side in FIG. 1.

From the standpoint of simplifying the design and the dimensional accuracy measurement, the inclination angle of reflecting surface 14 is preferably 45 degrees counterclockwise relative to first surface S1 (0 degree) in FIG. 1.

Further, as illustrated in FIG. 1 and FIG. 2, at a position (a position on the right side) on the reflection direction side of laser light La which is emitted from light emitting element 7 to reflecting surface 14 in second surface S2 and is reflected by reflecting surface 14, third recess 16 having a substantially trapezoidal cross-sectional shape is disposed toward the lower side.

A portion (tilted portion) facing reflecting surface 14 in the internal surface of third recess 16 is light separation part 17. Laser light La reflected by reflecting surface 14 is incident on light separation part 17 from the internal side of optical receptacle 2. Laser light La of light emitting element 7 incident on light separation part 17 is separated by light separation part 17 into monitor light M directed toward first surface S1 and signal light (light to be coupled with optical transmission member 5) Lc directed toward end surface 5a of optical transmission member 5.

As illustrated in FIG. 1, at a position where right end surface 2d of optical receptacle 2 faces end surface 5a of optical transmission member 5, one second optical surface 12 serving also as third surface S3 is formed. As with first optical surface 11, second optical surface 12 is a spherical or aspherical convex lens surface having a circular shape in plan view and projecting to end surface 5a side of optical transmission member 5. It is to be noted that optical axis (central axis) OA (2) on second optical surface 12 is preferably aligned with the central axis of end surface 5a of optical transmission member 5.

As illustrated in FIG. 1, signal light Lc separated by light separation part 17 is incident on second optical surface 12 from the internal side of optical receptacle 2. Signal light Lc incident on second optical surface 12 is converged and emitted (condensed) toward end surface 5a of optical transmission member 5 by second optical surface 12.

Figure 4:
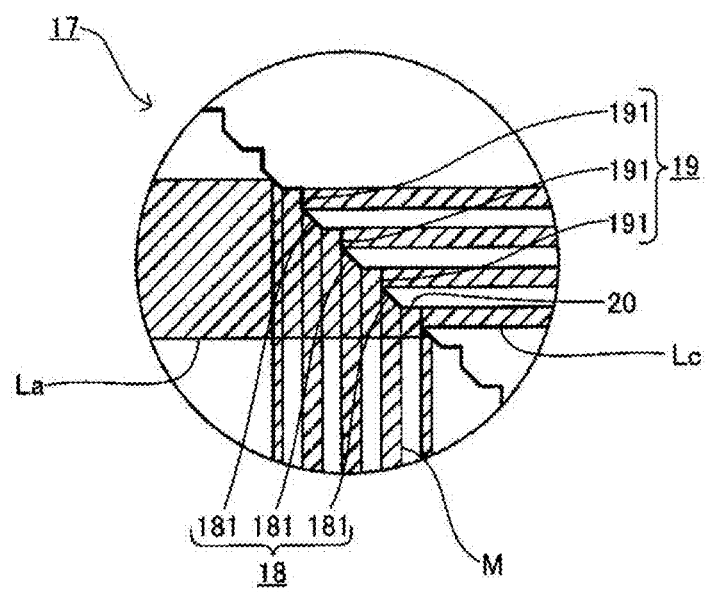
FIG. 4 is a partially enlarged sectional view of a light separation part of Embodiment 1.

Now light separation part 17 is described in detail. FIG. 4 is a partially enlarged sectional view of light separation part 17 of Embodiment 1. As illustrated in FIG. 4, light separation part 17 includes division reflection surface 18, division transmission surface 19 and step surface 20.

To be more specific, as illustrated in FIG. 4, division reflection surface 18 is tilted to first surface S1 side (the lower side in FIG. 4) (at a predetermined second inclination angle to first surface S1) toward second optical surface 12 (third surface S3) side (the right side in FIG. 4). In addition, division reflection surface 18 is disposed at even intervals in the inclination direction of division reflection surface 18 (second inclination angle direction) as a predetermined dividing direction. To be more specific, division reflection surface 18 includes a plurality of belt-shaped reflecting surface parts 181 extending in a direction (a depth direction as seen in FIG. 4) orthogonal to the inclination direction and the normal direction of division reflection surface 18. Reflecting surface parts 181 are disposed on one inclined plane at the second inclination angle as a whole. Preferably, the second inclination angle is 45 degrees clockwise from first surface S1 (0 degree) in FIG. 4.

As illustrated in FIG. 4, division transmission surface 19 is disposed in a region where division reflection surface 18 is not provided (mainly, the spaces between each reflecting surface part) such that division transmission surface 19 faces reflecting surface 14 in the reflection direction of laser light La of light emitting element 7. To be more specific, division transmission surface 19 is composed of a plurality of belt-shaped transmission surface parts 191 extending along the longitudinal direction of reflecting surface part 181 (the depth direction as seen in FIG. 4). Each transmission surface part 191 is continuously connected with adjacent reflecting surface part 181 on the first surface S1 side, and is disposed such that each transmission surface part 191 is orthogonal to the incident direction of laser light La with respect to transmission surface part 191. It is to be noted that each transmission surface part 191 may also be disposed such that each transmission surface part 191 is orthogonal to first surface S1.

In addition, as illustrated in FIG. 4, step surface 20 is disposed between transmission surface part 191 and reflecting surface part 181 adjacent to transmission surface part 191 on the second surface S2 side. In addition, step surface 20 is disposed such that step surface 20 is parallel to the incident direction of laser light La of light emitting element 7 with respect to light separation part 17.

In light separation part 17, a part of laser light La of light emitting element 7 reflected by reflecting surface 14 is incident on division reflection surface 18 at an incident angle greater than the critical angle, and another part of that laser light La is perpendicularly incident on division transmission surface 19.

The part of laser light La incident on division reflection surface 18 is totally reflected by division reflection surface 18 toward first surface S1 side as monitor light M.

The other part of laser light La incident on division transmission surface 19 passes through division transmission surface 19 toward the second optical surface 12 side as signal light Lc. At this time, since the other part of laser light La incident on division transmission surface 19 perpendicularly passes through division transmission surface 19, the signal light Lc is not refracted.

In addition, at this time, laser light La is not incident on step surface 20 since step surface 20 is formed in a direction parallel to the incident direction of laser light La.

As illustrated in FIG. 1 and FIG. 2, the part (right internal surface) opposed to light separation part 17 in the internal surface in third recess 16 with the internal space (air layer) of third recess 16 therebetween is transmission surface 21. Signal light Lc separated by light separation part 17 is perpendicularly incident on transmission surface 21 through the internal space of third recess 16. Then, transmission surface 21 allows the incident signal light Lc to perpendicularly pass therethrough toward second optical surface 12. At this time, signal light Lc is not refracted since signal light Lc perpendicularly passes through transmission surface 21.

In addition, as illustrated in FIG. 1 and FIG. 3, one third optical surface 13 is formed in a region around the right end part on first surface S1. As illustrated in FIG. 1 and FIG. 3, as with first optical surface 11, third optical surface 13 is a spherical or aspherical convex lens surface having a circular shape in plan view and projecting toward detection device 8 side. It is to be noted that the axis direction of optical axis (central axis) OA (3) on third optical surface 13 may be perpendicular to first surface S1.

As illustrated in FIG. 1, monitor light M totally reflected by division reflection surface 18 is incident on third optical surface 13 from the internal side of optical receptacle 2. Then, the internally incident monitor light M is converged and emitted toward detection device 8 by third optical surface 13.

Figure 6:
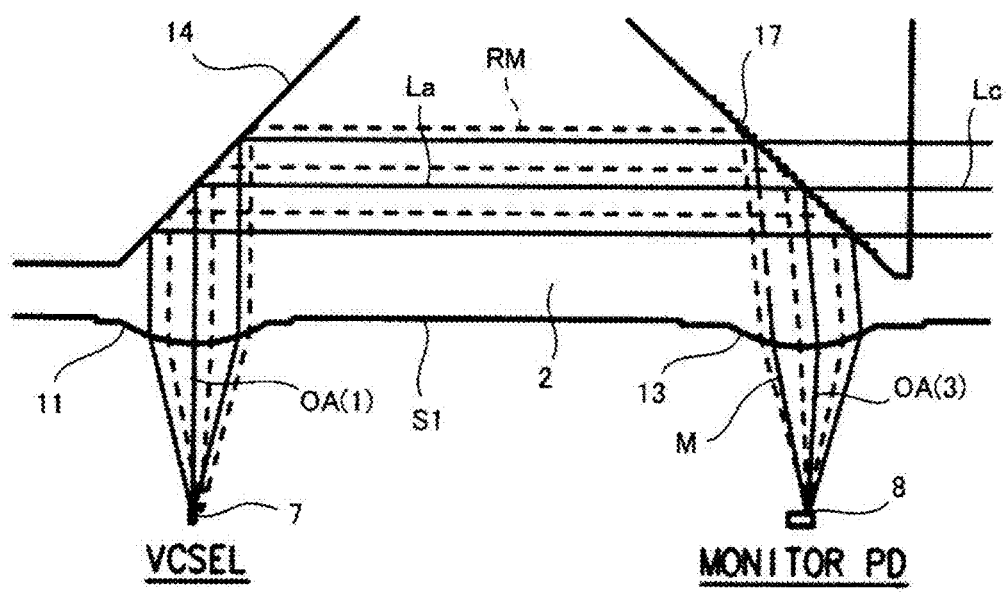
FIG. 6 is a partially enlarged sectional view illustrating an exemplary reflection monitor light avoiding part.
Figure 7:
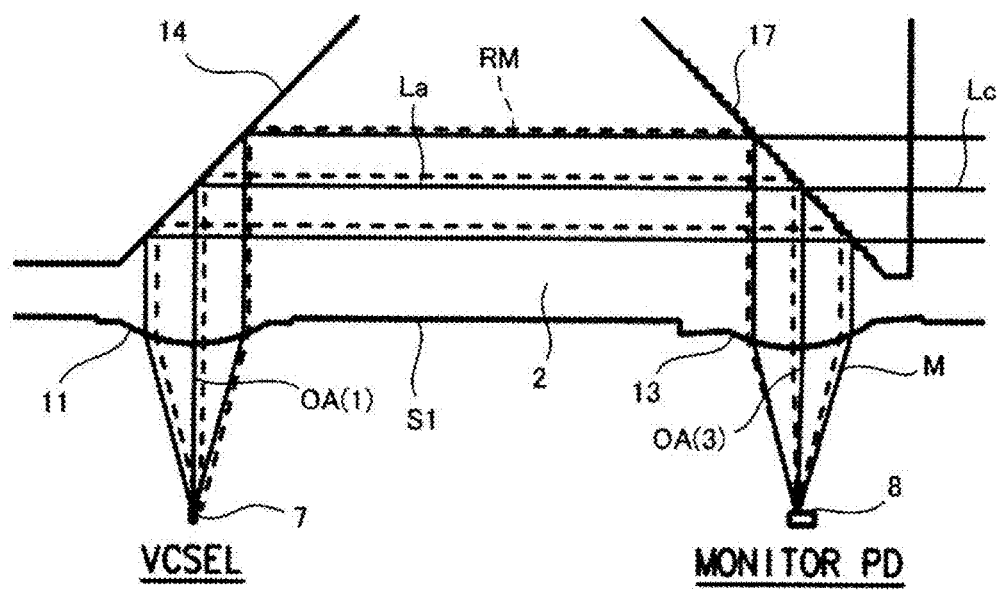
FIG. 7 is a partially enlarged sectional view illustrating another exemplary reflection monitor light avoiding part.

Further, in the present embodiment, at a middle position of the light path of monitor light M reflected by division reflection surface 18 and the light path of reflection monitor light RM (so-called return light) reflected by the light reception surface of detection device 8 and advancing toward light emitting element 7 (the light path between light separation part 17 and the light reception surface of detection device 8), a reflection monitor light avoiding part configured to guide reflection monitor light RM is disposed at a position away from light emitting element 7. FIG. 6 is a partially enlarged sectional view illustrating an example of the reflection monitor light avoiding part. FIG. 7 is a partially enlarged sectional view illustrating another example of the reflection monitor light avoiding part. In the present embodiment, as illustrated in FIG. 6, the reflection monitor light avoiding part is division reflection surface 18 which is set at the second inclination angle such that the optical axis of monitor light M is tilted relative to first surface S1. In addition, as illustrated in FIG. 7, the reflection monitor light avoiding part is third optical surface 13 whose central axis is set to intersect with the normal direction relative to first surface S1. Preferably, the changed angle is an angle at which the quantity of reflection monitor light RM which reaches light emitting element 7 is 0. It is to be noted that the reflection monitor light avoiding part may be a combination of division reflection surface 18 in which the second inclination angle is set such that the optical axis of monitor light M is tilted relative to first surface S1, and third optical surface 13 whose central axis is set to intersect with the normal direction relative to first surface S1.

In optical module 1 according to the present embodiment having the above-mentioned configuration, laser light La of light emitting element 7 incident on first surface S1 is reflected by reflecting surface 14, and the laser light La is separated into monitor light M and signal light Lc by reflection at division reflection surface 18 of light separation part 17 and transmission at division transmission surface 19 of light separation part 17. Then, monitor light M is emitted from first surface S1 to detection device 8 side, and signal light Lc is emitted from third surface S3 to end surface 5a side of optical transmission member 5. Thus, acquisition of monitor light M and taking out of signal light Lc in a direction along semiconductor substrate 6 at end surface 5a of optical transmission member 5 can be easily performed.

In addition, in optical module 1 according to the present embodiment, division reflection surface 18 is formed such that the optical axis of monitor light M tilted relative to the detection surface of detection device 8, and consequently monitor light M reflected by division reflection surface 18 obliquely reaches the detection surface of detection device 8. A part of monitor light M reaching the detection surface is reflected toward third optical surface 13 as reflection monitor light RM. At this time, the optical axis of reflection monitor light RM is tilted relative to the central axis of third optical surface 13. Thus, reflection monitor light RM is guided to a position away from light emitting element 7 (see Table 1 and FIG. 8).

reflection surface 18 by +1.5 degrees or more, or by −2.0 degrees or more. In addition, it was confirmed that, in the case where the configuration illustrated in FIG. 6 and the configuration illustrated in FIG. 7 are combined, the returning of reflection monitor light RM to light emitting element 7 can be surely prevented in a broad region where the quantity of light is 0 in Table 1. In actual design of the reflection monitor light avoiding part, it suffices to set the angle variation of division reflection surface 18 and the angle variation of central axis OA (3) of third optical surface

TABLE 1

| | | Inclination angle of division reflection surface (°) | | | | | | | | | | | | |
|---|---|---|---|---|---|---|---|---|---|---|---|---|---|---|
| | | 3.0 | 2.5 | 2.0 | 1.5 | 1.0 | 0.5 | 0.0 | −0.5 | −1.0 | −1.5 | −2.0 | −2.5 | −3.0 |
| Inclination angle of central axis of third optical surface (°) | −5.0 | 0.0 | 0.2 | 1.0 | 1.5 | 2.1 | 1.6 | 1.1 | 0.0 | 0.0 | 0.0 | 0.0 | 0.0 | 0.0 |
| | −4.5 | 0.0 | 1.0 | 2.1 | 3.2 | 3.5 | 2.2 | 1.5 | 0.0 | 0.0 | 0.0 | 0.0 | 0.0 | 0.0 |
| | −4.0 | 0.0 | 0.0 | 3.7 | 4.2 | 4.8 | 3.5 | 2.1 | 0.2 | 0.0 | 0.0 | 0.0 | 0.0 | 0.0 |
| | −3.5 | 0.0 | 0.0 | 2.3 | 3.2 | 5.3 | 4.1 | 3.2 | 1.2 | 0.0 | 0.0 | 0.0 | 0.0 | 0.0 |
| | −3.0 | 0.0 | 0.0 | 0.6 | 2.4 | 4.6 | 4.3 | 4.2 | 2.1 | 0.0 | 0.0 | 0.0 | 0.0 | 0.0 |
| | −2.5 | 0.0 | 0.0 | 0.0 | 2.3 | 4.2 | 3.5 | 3.5 | 1.3 | 0.0 | 0.0 | 0.0 | 0.0 | 0.0 |
| | −2.0 | 0.0 | 0.0 | 0.0 | 2.1 | 3.9 | 3.1 | 2.0 | 1.3 | 0.3 | 0.0 | 0.0 | 0.0 | 0.0 |
| | −1.5 | 0.0 | 0.0 | 0.0 | 1.6 | 4.2 | 5.6 | 5.4 | 3.7 | 2.2 | 0.0 | 0.0 | 0.0 | 0.0 |
| | −1.0 | 0.0 | 0.0 | 0.0 | 1.4 | 6.4 | 7.3 | 8.5 | 6.5 | 3.9 | 0.0 | 0.0 | 0.0 | 0.0 |
| | −0.5 | 0.0 | 0.0 | 0.0 | 0.0 | 4.2 | 6.2 | 6.2 | 4.2 | 3.1 | 0.0 | 0.0 | 0.0 | 0.0 |
| | 0.0 | 0.0 | 0.0 | 0.0 | 0.0 | 1.2 | 1.6 | 1.3 | 0.9 | 1.1 | 0.6 | 0.0 | 0.0 | 0.0 |
| | 0.5 | 0.0 | 0.0 | 0.0 | 0.0 | 3.2 | 3.4 | 4.5 | 5.4 | 4.3 | 2.1 | 0.0 | 0.0 | 0.0 |
| | 1.0 | 0.0 | 0.0 | 0.0 | 0.0 | 4.5 | 6.3 | 9.3 | 9.1 | 8.7 | 3.2 | 0.0 | 0.0 | 0.0 |
| | 1.5 | 0.0 | 0.0 | 0.0 | 0.0 | 0.0 | 4.2 | 5.2 | 5.3 | 4.3 | 2.1 | 0.0 | 0.0 | 0.0 |
| | 2.0 | 0.0 | 0.0 | 0.0 | 0.0 | 0.0 | 2.1 | 1.0 | 1.4 | 1.3 | 0.9 | 0.0 | 0.0 | 0.0 |
| | 2.5 | 0.0 | 0.0 | 0.0 | 0.0 | 0.0 | 1.5 | 3.4 | 3.5 | 3.1 | 1.3 | 0.0 | 0.0 | 0.0 |
| | 3.0 | 0.0 | 0.0 | 0.0 | 0.0 | 0.0 | 1.2 | 5.9 | 4.5 | 8.3 | 4.2 | 0.7 | 0.0 | 0.0 |
| | 3.5 | 0.0 | 0.0 | 0.0 | 0.0 | 0.0 | 1.0 | 6.2 | 6.5 | 5.3 | 2.5 | 2.1 | 0.0 | 0.0 |
| | 4.0 | 0.0 | 0.0 | 0.0 | 0.0 | 0.0 | 0.3 | 1.0 | 1.2 | 1.5 | 0.7 | 1.4 | 0.0 | 0.0 |
| | 4.5 | 0.0 | 0.0 | 0.0 | 0.0 | 0.0 | 0.0 | 1.5 | 2.3 | 3.1 | 1.4 | 1.0 | 0.5 | 0.0 |
| | 5.0 | 0.0 | 0.0 | 0.0 | 0.0 | 0.0 | 0.0 | 1.8 | 3.2 | 5.1 | 3.1 | 4.0 | 0.2 | 0.0 |

Figure 8:
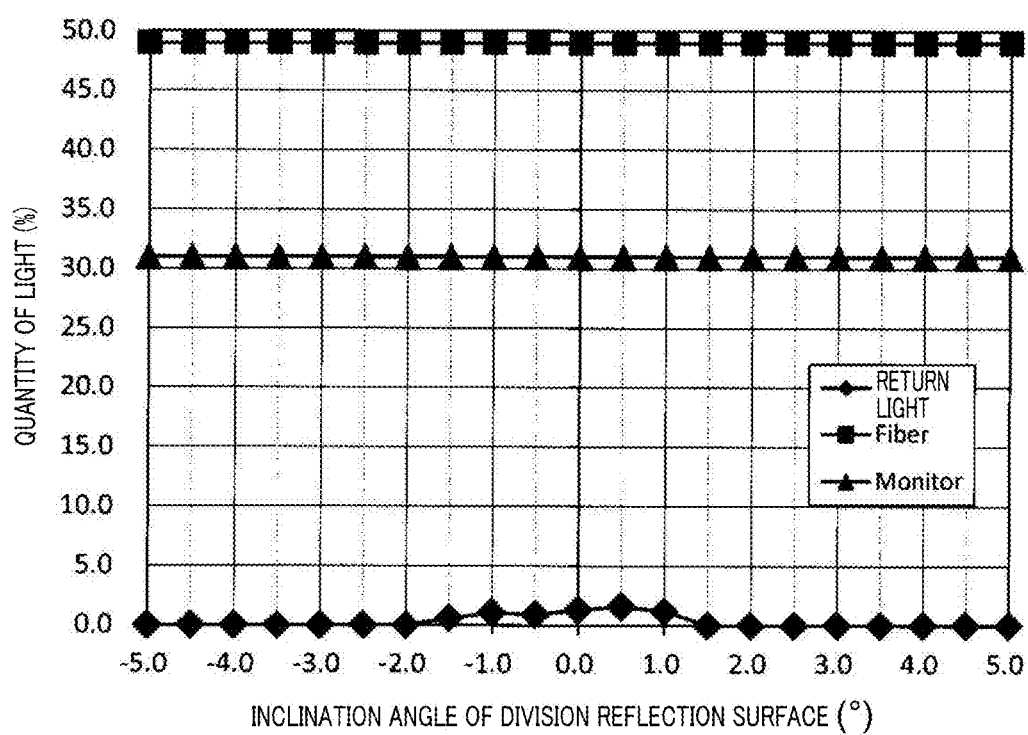
FIG. 8 is a graph showing a relationship between variation of the quantity of reflection monitor light and variation of the inclination angle of the division reflection surface in the case where the central axis of a third optical surface is not changed.

Table 1 shows the quantity of reflection monitor light RM at a position of light emitting element 7 in the case where the inclination angle of division reflection surface 18 is changed stepwise by 0.5 degrees from the second inclination angle (45 degrees), and central axis OA (3) of third optical surface 13 is changed stepwise by 0.5 degrees from the normal direction of first surface S1. The quantity of reflection monitor light RM is represented by a ratio with the quantity of laser light La emitted from light emitting element 7 set to 100%. In addition, in FIG. 6, plus (+) represents the case where the inclination angle of division reflection surface 18 is changed clockwise, and minus (−) indicates the case where the inclination angle of division reflection surface 18 is changed counterclockwise. In addition, in FIG. 6, plus (+) indicates the case where central axis OA (3) of third optical surface is changed clockwise, and minus (−) indicates the case where central axis OA (3) of third optical surface is changed counterclockwise. FIG. 8 shows the quantity of light of the state of the change angle=0 (the configuration of FIG. 6) where central axis OA (3) of third optical surface 13 of Table 1 is aligned with the normal direction relative to first surface S1. FIG. 8 also shows the quantity of signal light Lc (quantity of light of approximately 50%) and the quantity of monitor light M (quantity of light of approximately 30%).

FIG. 8 is a graph showing a relationship between variation of the quantity of reflection monitor light and variation of the inclination angle of the division reflection surface in the case where the central axis of the third optical surface is not changed. As shown in Table 1 and FIG. 8, it was confirmed that, in the case of the configuration illustrated in FIG. 6, the returning of reflection monitor light RM to light emitting element 7 can be surely prevented by changing division 13 by selection from Table 1. Regarding the variation of the inclination angle of division reflection surface 18 and the variation of the inclination angle of central axis OA (3) of third optical surface 13, the returning of reflection monitor light RM to light emitting element 7 can be prevented by variation of 0.5 degrees although it depends on the setting value of the other. When the reflection monitor light avoiding part is utilized, it is not necessary to tilt the mounted components and the like with respect to semiconductor substrate 6, and further, it is not necessary to perform focus adjustment of optical surfaces 11 and 12 in the height direction (axis direction), thus making it possible to reduce assembly cost. In addition, when the reflection monitor light avoiding part is adopted in other embodiments and examples described later, the function of optical module 1 according to the present embodiment can be achieved. To be more specific, also in optical module 1 according to other embodiments and examples, the returning of reflection light from detection device 8 to light emitting element 7 can be prevented and the optical property can be further improved.

Figure 5A:
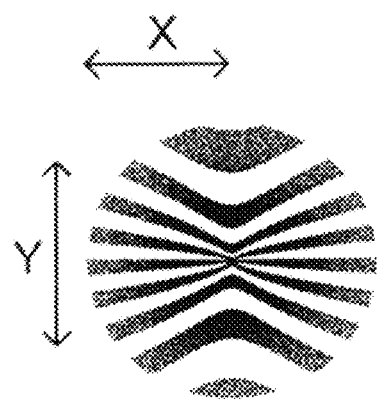
FIG. 5A illustrates a spot shape of signal light at an end surface of an optical transmission member of Embodiment 1.
Figure 5B:
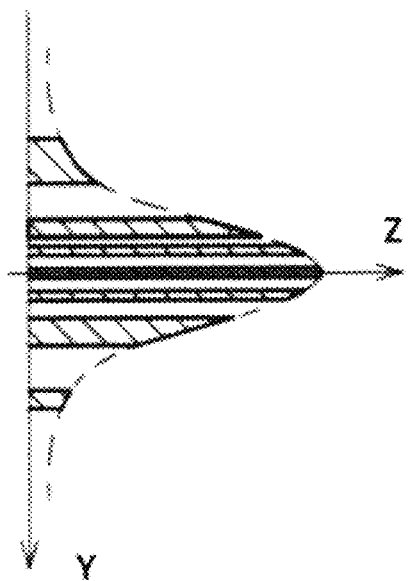
FIG. 5B illustrates an intensity distribution of signal light at an end surface of the optical transmission member.

FIG. 5A illustrates a spot shape of signal light on end surface 5a of optical transmission member 5 in Embodiment 1. As illustrated in FIG. 5A, with the configuration in which division transmission surface 19 is divided, the cross sectional shape in a direction orthogonal to the travelling direction of signal light Lc can be set to a shape close to a circle as a whole. It is to be noted that the cross sectional shape of signal light Lc in FIG. 5A is a spot shape on end surface 5a of optical transmission member 5. The X-axis direction in FIG. 5A indicates the longitudinal direction of reflecting surface part 181 in the radial direction of end surface 5a of optical transmission member 5, and the Y-axis direction in FIG. 5A indicates the direction orthogonal to the longitudinal direction of reflecting surface part 181 in the radial direction of end surface 5a of optical transmission member 5. In addition, FIG. 5B illustrates the intensity distribution of signal light Lc on a virtual YZ plane at end surface 5a of optical transmission member 5. The Z-axis direction in FIG. 5B indicates the surface normal direction of end surface 5a (in other words, the incident direction of signal light Lc). Since such signal light Lc can be obtained, significant reduction in light coupling efficiency can be prevented even when a radial displacement is caused at optical transmission member 5 to a certain degree. Thus, in optical module 1, light transmission performed with monitoring can be properly performed. In addition, since such proper light transmission is ensured, the positional accuracy of optical transmission member 5 with respect to optical receptacle 2 can be moderated.

Further, in optical module 1 according to the present embodiment, division reflection surface 18 is disposed on one plane. Thus, in the case of metal mold working where optical receptacle 2 is molded with use of an injection molding metal mold with resin, it suffices to create the shape transfer surfaces of division transmission surface 19 and step surface 20 between the shape transfer surfaces of division reflection surface 18 by groove working in the front-rear (upper and lower in FIG. 2) direction with use of a tool (cutting tool or the like). Thus, a metal mold having favorable dimensional accuracy can be simply and quickly obtained at low cost. In addition, in this case, by forming unavoidable step surface 20 such that the surface is parallel to the light path, the influence of step surface 20 on the optical performance can be reduced as much as possible.

In addition, with first optical surface 11 and second optical surface 12, the optical coupling between light emitting element 7 and end surface 5a of optical transmission member 5 can be efficiently performed, and with third optical surface 13, monitor light M can be efficiently coupled with detection device 8.

In addition, in optical module 1 according to the present embodiment, first optical surface 11 is formed to convert incident laser light La into collimate light (parallel light) having a constant light flux diameter, and thus only collimate light can be used inside optical receptacle 2. Thus, even when dimensional error in the travelling direction of collimate light La, Lc, and M is caused in optical receptacle 2, it is possible to properly ensure the quantity of coupling light (in other words, coupling efficiency) to end surface 5a of optical transmission member 5 and detection device 8, and the position of the condensing point of the incident light on optical transmission member 5 and detection device 8. As a result, optical module 1 can be readily manufactured by moderating the dimensional accuracy of optical receptacle 2 while maintaining the optical performance.

It is to be noted that a reflection film composed of a thin film of a metal having a high light reflectance (such as Al, Ag and Au) or the like may be formed on reflecting surface 14 and on division reflection surface 18 as necessary. In the case where reduction of the number of components is required to be prioritized, it is preferable to employ the configuration utilizing only total reflection as described above.

In addition, from the standpoint of simplifying the design and improving the stability of the light coupling efficiency, it is preferable to form transmission surface parts 191 having widths equal to each other in a direction orthogonal to the longitudinal direction and disposed at even intervals in the dividing direction.

In the following, other embodiments, examples and so forth of the present invention will be described.

(Modification)

Figure 9:
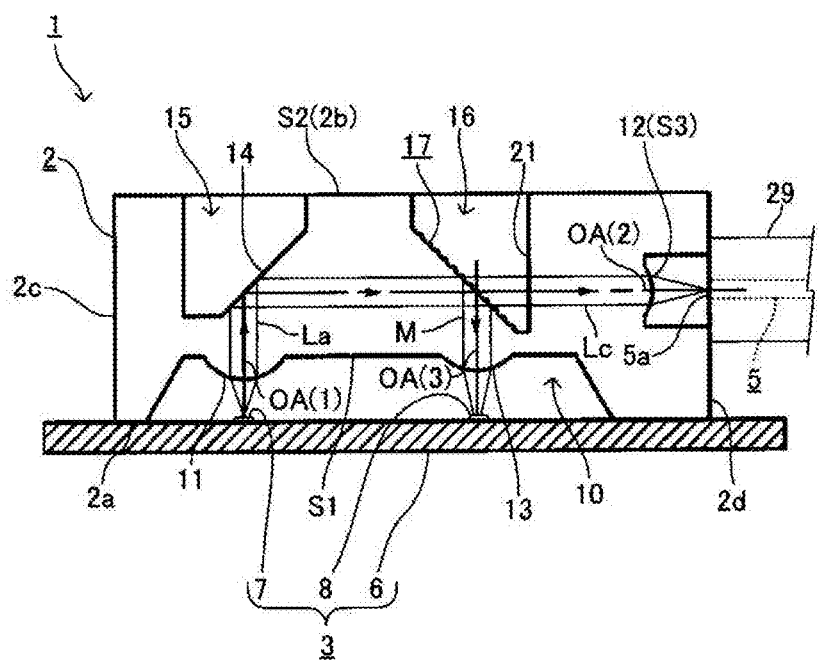
FIG. 9 is a sectional view illustrating a configuration of an optical module according to a modification of Embodiment 1.
Figure 10:
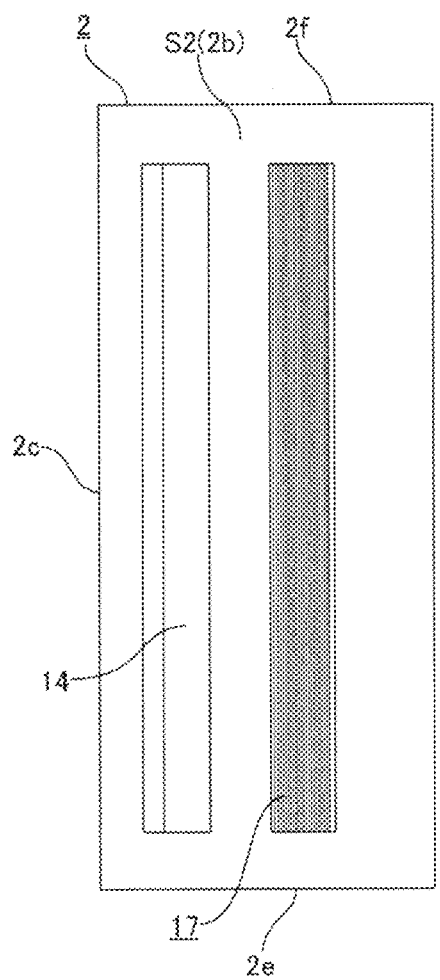
FIG. 10 is a plan view of an optical receptacle according to the modification of Embodiment 1.
Figure 11:
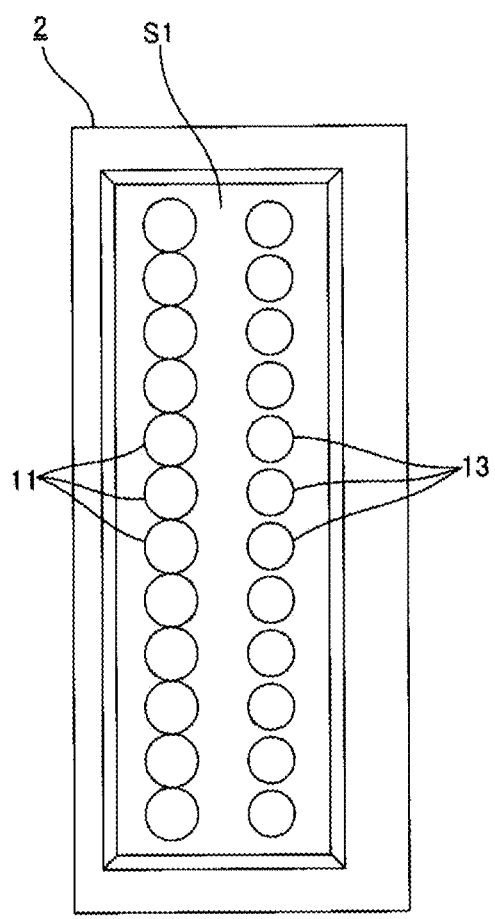
FIG. 11 is a bottom view of the optical receptacle according to the modification of Embodiment 1.
Figure 12:
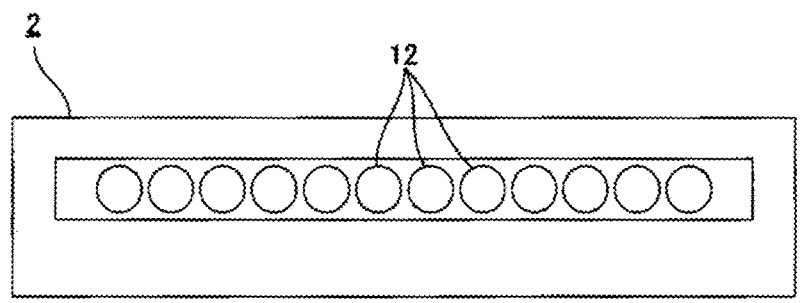
FIG. 12 is a right side view of the optical receptacle according to the modification of Embodiment 1.

Next, modifications of the present embodiment will be described with reference to FIG. 9 to FIG. 12. FIG. 9 is a sectional view illustrating a configuration of optical module 1 according to a modification of Embodiment 1. FIG. 10 is a plan view of optical receptacle 2 according to the modification of Embodiment 1. FIG. 11 is a bottom view of optical receptacle 2 according to the modification of Embodiment 1. FIG. 12 is a right side view of optical receptacle 2 according to the modification of Embodiment 1.

Optical module 1 and optical receptacle 2 are of a lens array type in the present modification. In addition, optical module 1 and optical receptacle 2 of the present modification have a configuration for multichannel light transmission performed with monitoring, in addition to the configurations of the main part of optical module 1 and optical receptacle 2 illustrated in FIG. 1 to FIG. 5.

A plurality of (twelve) light emitting elements 7 and detection devices 8 according to the present modification are laid out in the depth direction as seen in FIG. 9 in photoelectric conversion device 3. In addition, optical transmission members 5 are laid out in the direction in which light emitting element 7 and detection device 8 are laid out, and the number of optical transmission members 5 is equal to that of light emitting element 7 and detection device 8. It is to be noted that, in FIG. 9, each optical transmission member 5 is housed in multicore collective connector 29 and attached on optical receptacle 2 with a publicly known attaching means.

Further, in accordance with the configurations of photoelectric conversion device 3 and optical transmission member 5, optical receptacle 2 has a large dimension in the depth direction as seen in FIG. 9 in comparison with the basic configuration such that the light path between each light emitting element 7 and each optical transmission member 5, and the light path between each light emitting element 7 and each detection device 8 can be formed. To be more specific, first to third surfaces S1 to S3, reflecting surface 14 and light separation part 17 are formed in a large size in the depth direction as seen in FIG. 6 such that the light path of laser light La can be formed for each light emitting element 7. In addition, first to third optical surfaces 11 to 13 are formed at respective positions corresponding to light emitting element 7, end surface 5a of optical transmission member 5 and detection device 8, and the number of first to third optical surfaces 11 to 13 are equal to that of light emitting element 7, optical transmission member 5 and detection device 8, respectively.

With the optical module of the modification of Embodiment 1, laser light La of each light emitting element 7 can be separated into signal light Lc and monitor light M for each light emitting element 7 at light separation part 17. In addition, since the spot shape illustrated in FIG. 5A can be obtained for each signal light Lc, multichannel light transmission performed with monitoring can be simply and properly performed.

EXAMPLE 1

Next, as an example of the present embodiment, example configurations 1 and 2 of light separation part 17 will be described.

Figure 13A:
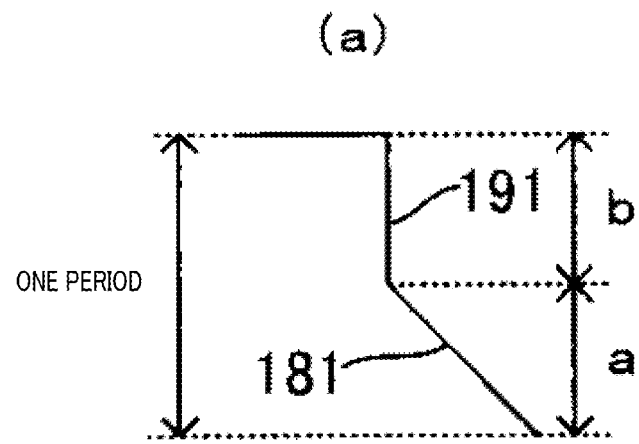
FIG. 13A and FIG. 13B illustrate example configuration 1 of a light separation part in an example of Embodiment 1.
Figure 13B:
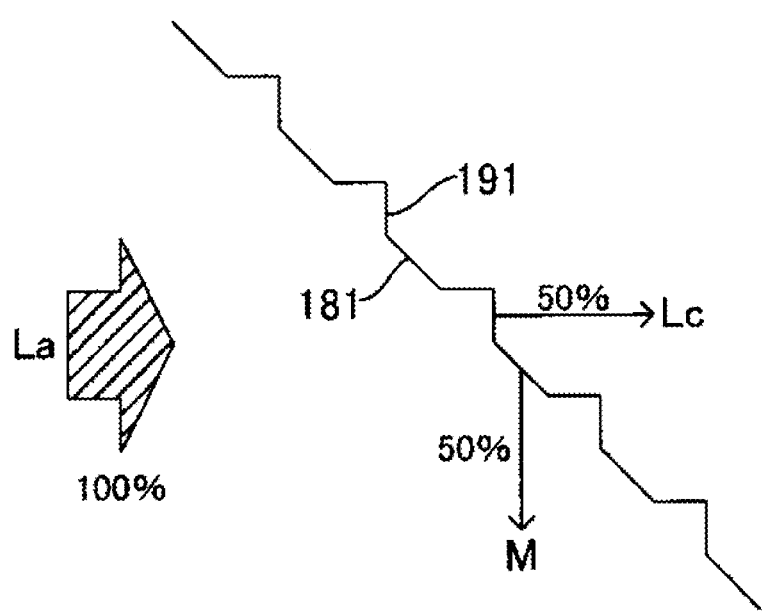

FIG. 13A and FIG. 13B illustrate example configuration 1 of light separation part 17 in an example of Embodiment 1. As illustrated in FIG. 13A, in example configuration 1 of light separation part 17, the inclination angle of reflecting surface part 181 is approximately 45 degrees clockwise relative to first surface S1. In addition, transmission surface part 191 is formed to be orthogonal to first surface S1. Further, dimension a of reflecting surface part 181 in the direction orthogonal to first surface S1 and dimension b of transmission surface part 191 in that direction are set such that the ratio of a:b is 1:1.

As illustrated in FIG. 13B, in this case, in the pair of reflecting surface part 181 and transmission surface part 191 adjacent to each other, each of the light reflectance and the light transmittance can be set to 50%.

Figure 14A:
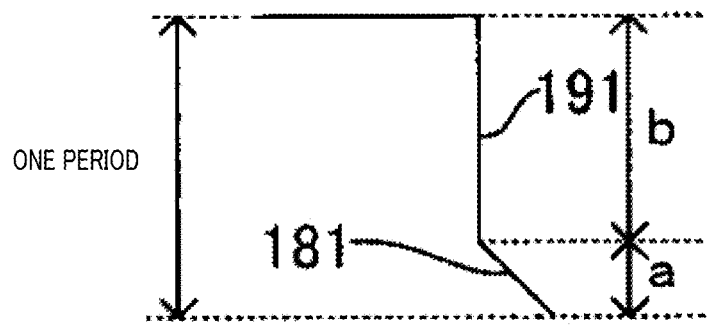
FIG. 14A and FIG. 14B illustrate example configuration 2 of a light separation part in the example of Embodiment 1.
Figure 14B:
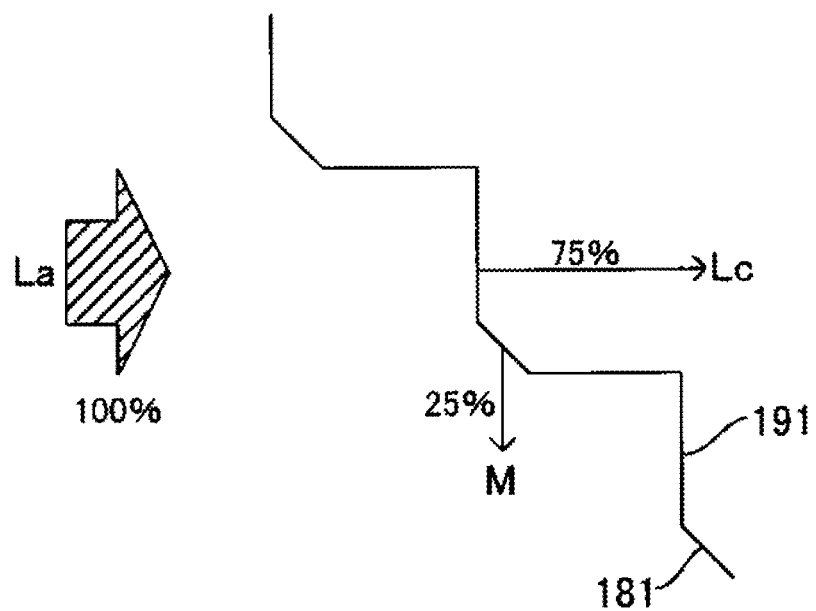

FIG. 14A and FIG. 14B illustrate example configuration 2 of light separation part 17 in the example of Embodiment 1. As illustrated in FIG. 14A, in example configuration 2 of light separation part 17, the inclination angle of reflecting surface part 181 is approximately 45 degrees clockwise relative to first surface S1 as in FIG. 13A. In addition, transmission surface part 191 is formed to be orthogonal to first surface S1. Further, dimension a of reflecting surface part 181 in the direction orthogonal to first surface S1 and dimension b of transmission surface part 191 in that direction are set such that the ratio of a:b is 1:3.

As illustrated in FIG. 14B, in this case, in the pair of reflecting surface part 181 and transmission surface part 191 adjacent to each other, the light reflectance and the light transmittance can be set to 25% and 75%, respectively.

[Embodiment 2]

Figure 15:
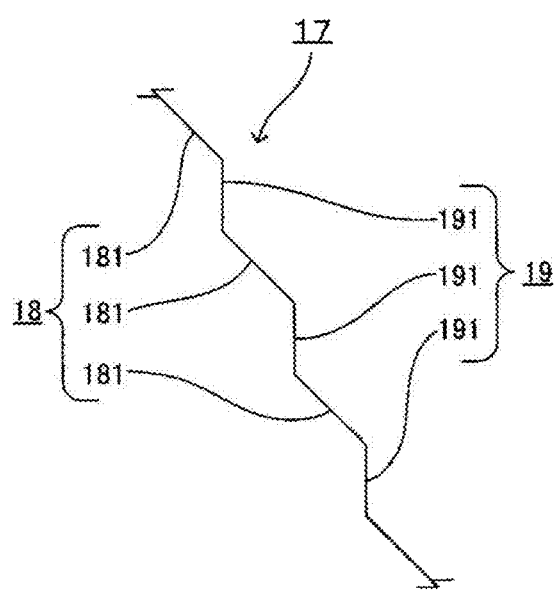
FIG. 15 illustrates a configuration of a light separation part according to Embodiment 2 of the present invention.
Figure 16A:
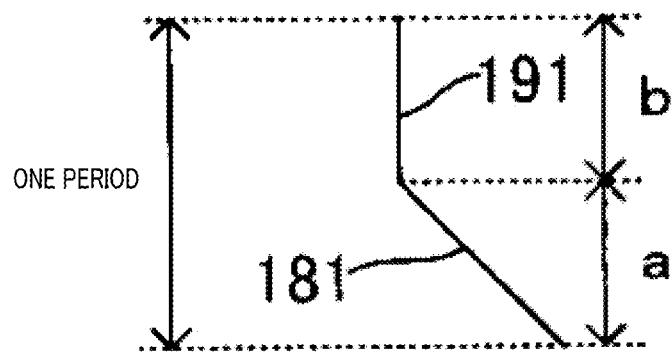
FIG. 16A and FIG. 16B illustrate example configuration 1 of a light separation part in an example of Embodiment 2.
Figure 16B:
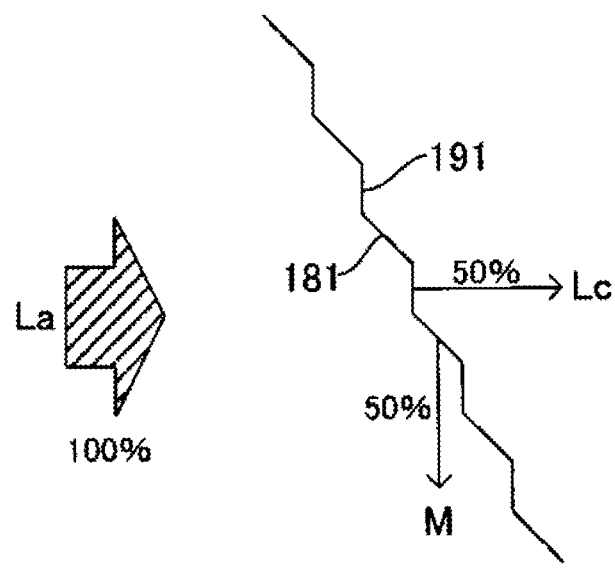
Figure 17A:
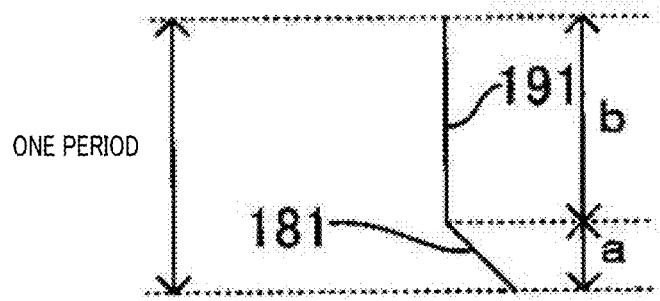
FIG. 17A and FIG. 17B illustrate example configuration 2 of a light separation part in the example of Embodiment 2.
Figure 17B:
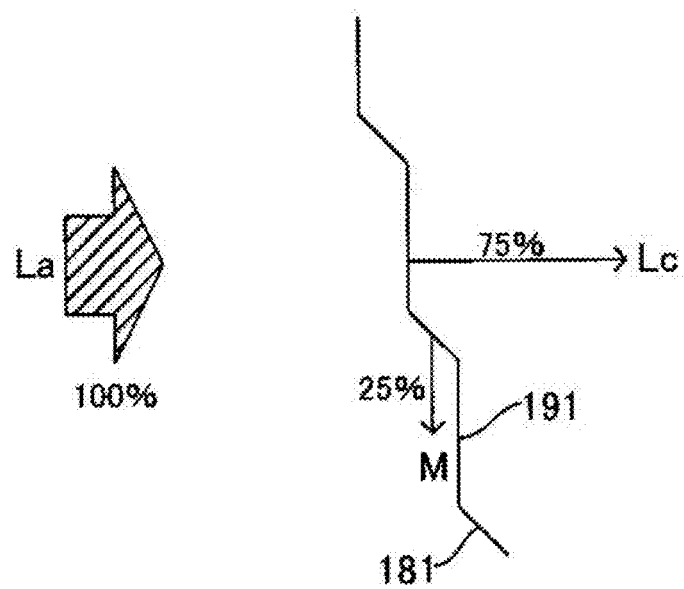

An optical receptacle and an optical module having the optical receptacle according to Embodiment 2 will be described with reference to FIG. 15 to FIG. 17B, mainly for configurations different from Embodiment 1. FIG. 15 illustrates a configuration of light separation part 17 according to Embodiment 2 of the present invention. FIG. 16A and FIG. 16B illustrate example configuration 1 of light separation part 17 in the example of Embodiment 2. FIG. 17A and FIG. 17B illustrate example configuration 2 of light separation part 17 in the example of Embodiment 2.

As illustrated in FIG. 15, division reflection surface 18 in Embodiment 2 is divided in the direction orthogonal to first surface S1 (vertical direction in FIG. 15).

In addition, in Embodiment 2, transmission surface part 191 is continuously connected to adjacent reflecting surface part 181 on first surface S1 side, and is continuously connected to adjacent reflecting surface part 181 on second surface S2 side.

Other configurations and applicable modifications are identical to those of Embodiment 1, and therefore the detailed description thereof will be omitted.

With the optical module according to Embodiment 2, by continuously connecting reflecting surface part 181 and transmission surface part 191, light separation part 17 can be composed with only an optically required surface (step surface 20 of Embodiment 1 can be omitted). Thus, when optical receptacle 2 is molded with resin with a metal mold, the contact area of light separation part 17 and the metal mold can be reduced, and favorable releasability can be ensured. In addition, the size of light separation part 17 in the transmission direction of signal light Lc can be reduced.

EXAMPLE 2

Next, as the example of Embodiment 2, example configurations 1 and 2 of light separation part 17 will be described.

As illustrated in FIG. 16A, in example configuration 1 of light separation part 17, the inclination angle of reflecting surface part 181 is approximately 45 degrees clockwise relative to first surface S1. In addition, transmission surface part 191 is formed to be orthogonal to first surface S1. Further, dimension a of reflecting surface part 181 in the direction orthogonal to first surface S1 and dimension b of transmission surface part 191 in that direction are formed such that the ratio of a:b is 1:1.

As illustrated in FIG. 16B, in this case, in the pair of reflecting surface part 181 and transmission surface part 191 adjacent to each other, each of the light reflectance and the light transmittance can be set to 50%.

As illustrated in FIG. 17A, in example configuration 2 of light separation part 17, the inclination angle of reflecting surface part 181 is approximately 45 degrees clockwise relative to first surface S1 as in FIG. 16A. In addition, transmission surface part 191 is formed to be orthogonal to first surface S1. Further, dimension a of reflecting surface part 181 in the direction orthogonal to first surface S1 and dimension b of transmission surface part 191 in that direction are formed such that the ratio of a:b is 1:3.

As illustrated in FIG. 17B, in this case, in the pair of reflecting surface part 181 and transmission surface part 191 adjacent to each other, the light reflectance and the light transmittance can be set to 25%, and 75%, respectively.

[Embodiment 3]

Figure 18A:
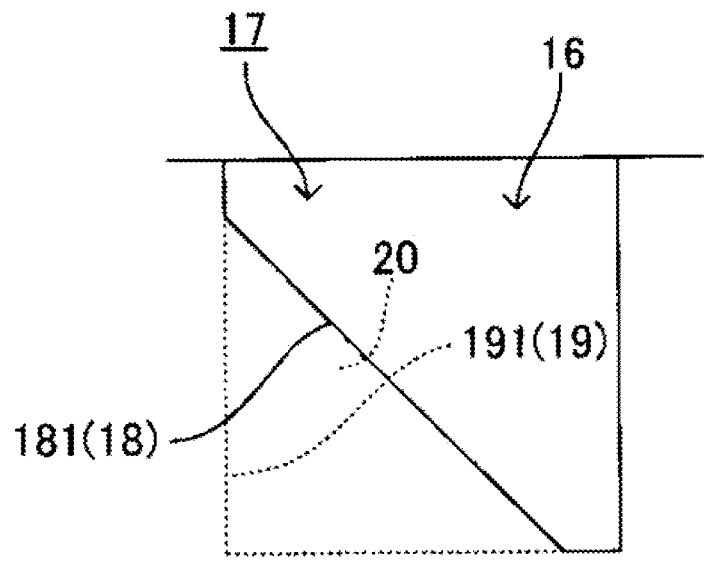
FIG. 18A and FIG. 18B illustrate a configuration of a light separation part of Embodiment 3.
Figure 18B:
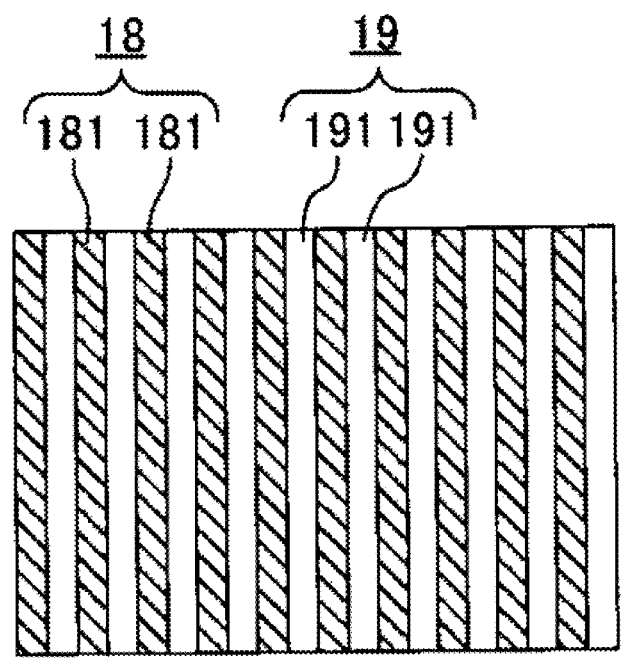
Figure 19:
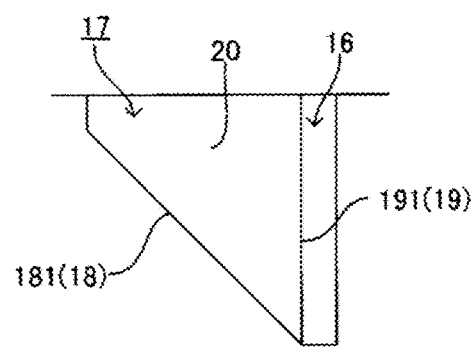
FIG. 19 illustrates a configuration of a third recess of a modification of Embodiment 3.

Next, an optical receptacle and an optical module having the optical receptacle according to Embodiment 3 of the present invention will be described with reference to FIG. 18A, FIG. 18B and FIG. 19, mainly for configurations different from Embodiment 1. FIG. 18A and FIG. 18B illustrate a configuration of light separation part 17 of Embodiment 3. FIG. 19 illustrates a configuration of third recess 16 of a modification of Embodiment 3.

In the present embodiment, the dividing direction of division reflection surface 18 is a direction orthogonal to the inclination direction of division reflection surface 18 (second inclination angle direction) and the surface normal direction as illustrated in a longitudinal sectional view of FIG. 18A and a left side view of FIG. 18B.

As illustrated in FIG. 18A and FIG. 18B, division reflection surface 18 of the present embodiment includes a plurality of reflecting surface parts 181 extending in the inclination direction.

In addition, division transmission surface 19 includes a plurality of transmission surface parts 191 extending in the direction orthogonal to first surface S1 and disposed in a direction orthogonal to the incident direction of signal light Lc.

In addition, step surface 20 parallel to the incident direction of laser light La of light emitting element 7 on light separation part 17 is formed between transmission surface part 191 and reflecting surface part 181 adjacent to transmission surface part 191.

While division transmission surface 19 is formed at the position same as the left end portion of division reflection surface 18 as illustrated in FIG. 18A and FIG. 18B, division transmission surface 19 may be formed at the position same as the right end part of division reflection surface 18 as illustrated in FIG. 19.

Other configurations and applicable modifications are identical to those of Embodiment 1, and therefore the detailed description thereof will be omitted.

With the optical module according to Embodiment 3, reflecting surface parts 181 can be disposed on one inclined plane, and transmission surface parts 191 can be disposed on one perpendicular plane, and thus the ease of design is increased. In addition, with the optical module according to Embodiment 3, the influence of step surface 20 on the optical performance can be reduced as much as possible since step surface 20 is parallel to the light path.

[Embodiment 4]

Figure 20:
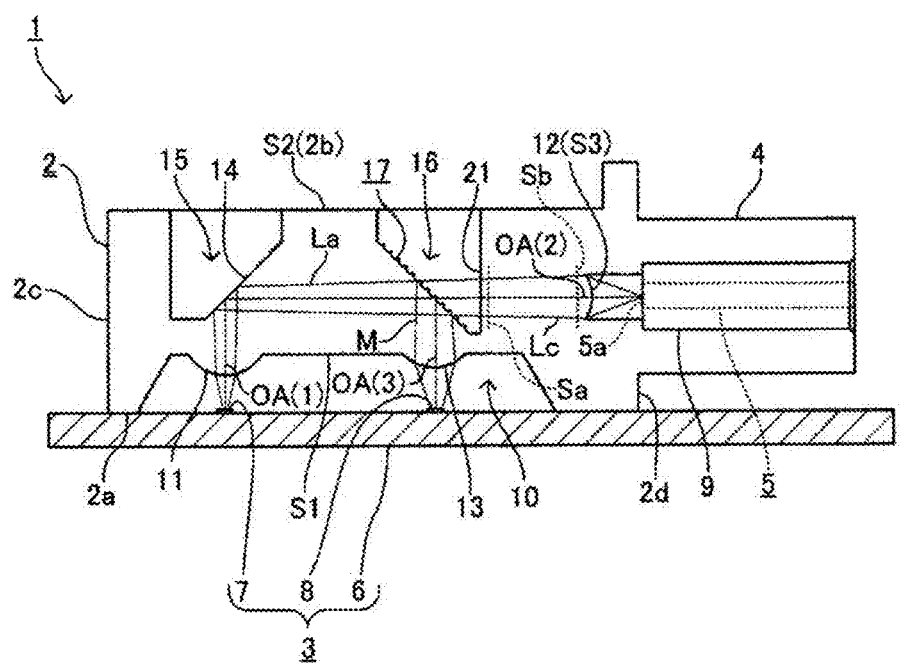
FIG. 20 illustrates a configuration of an optical module according to Embodiment 4.

Next, optical receptacle 2 and optical module 1 having optical receptacle 2 according to Embodiment 4 of the present invention will be described with reference to FIG. 20 to FIG. 29B, mainly for configurations different from Embodiment 1. FIG. 20 illustrates a configuration of optical module 1 according to Embodiment 4. FIG. 22 illustrates an intensity distribution of signal light at an end surface of optical transmission member 5 in Embodiment 4.

As illustrated in FIG. 20, in the present embodiment, first optical surface 11 converges laser light La to converging light other than collimate light and outputs the light toward reflecting surface 14 instead of collimating the laser light La as in Embodiment 1.

To be more specific, in the configuration illustrated in FIG. 20, first optical surface 11 converts laser light La reached from light emitting element 7 into converging light whose light flux diameter gradually increases as it travels forward in the travelling direction. Such a configuration of the present embodiment may be achieved by, for example, reducing the positive power of first optical surface 11 in comparison with the configuration of Embodiment 1.

Figure 21A:
FIG. 21A to FIG. 21C show simulations of variation of the spot shape (cross-sectional shape) of signal light at different positions on the light path of the signal light in Embodiment 4.
Figure 21B:
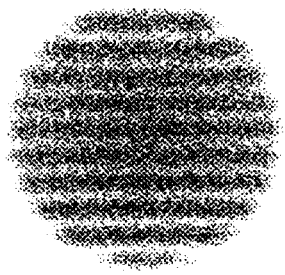
Figure 21C:
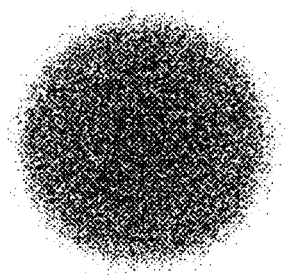
Figure 22:
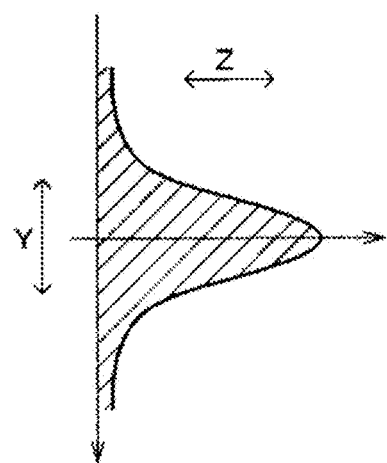
FIG. 22 illustrates an intensity distribution of signal light at an end surface of the optical fiber in Embodiment 4.

FIG. 21A to FIG. 21C illustrate simulations of the beam spot shape of signal light Lc at different positions on the light path of signal light Lc in the configuration of the present embodiment. To be more specific, FIG. 21A illustrates a spot shape of signal light Lc on plane Sa which is virtually provided at a position immediately after transmission surface 21 on the light path in FIG. 20. In addition, FIG. 21B illustrates the spot shape of signal light Lc on plane Sb which is virtually provided at a position immediately before second optical surface 12 on the light path in FIG. 20. Further, FIG. 21C illustrates the spot shape of signal light Lc on end surface 5a of optical transmission member 5.

As illustrated in FIG. 21A to FIG. 21C, in the present embodiment, the spot shape of signal light Lc clearly sectioned in a belt shape reflecting division transmission surface 19 at a timing immediately after division (FIG. 21A) is deformed such that the width of the belts decreases as it travels forward (optical transmission member 5 side) (FIG. 21B), and finally the shape becomes a completely single circle spot having no division on end surface 5a of optical transmission member 5 (FIG. 21C). This is because of the configuration in which first optical surface 11 convers laser light La into converging light (non-collimate light) whose diameter increases as it advances.

In addition, since the above-mentioned non-collimate light is employed in the present embodiment, the intensity distribution of signal light Lc at end surface 5a of optical transmission member 5 can be set to a shape whose intensity gradually decreases from the central axis side (maximum intensity side) toward the periphery side as illustrated in FIG. 22. Such an intensity distribution has a shape substantially similar to that of the intensity distribution of laser light La at a timing before separation at light separation part 17 (the timing includes the timing when the light is emitted from light emitting element 7).

With the above-mentioned configuration of the present embodiment, the coupling efficiency can be further improved, and in addition, reduction in light coupling efficiency due to positional displacement in the radial direction of optical transmission member 5 can be further effectively reduced in comparison with Embodiment 1. Further, with uniformization of light intensity, radiation loss (bending loss) in the case where optical transmission member 5 is bent when in use can be reduced. Thus, light transmission performed with monitoring can be further properly performed.

In addition, according to the present embodiment, the diameter of signal light Lc can be increased along with the advancement of the light, and therefore, even when foreign matters or scratches exist on second optical surface 12, the area occupancy of foreign matters/scratches with respect to the light spot of signal light Lc on second optical surface 12 can be reduced. Thus, the influence of foreign matters/scratches of second optical surface 12 on the coupling efficiency can be effectively reduced.

It is to be noted that the present embodiment includes various modifications described below.

(Modification 1)

Figure 23A:
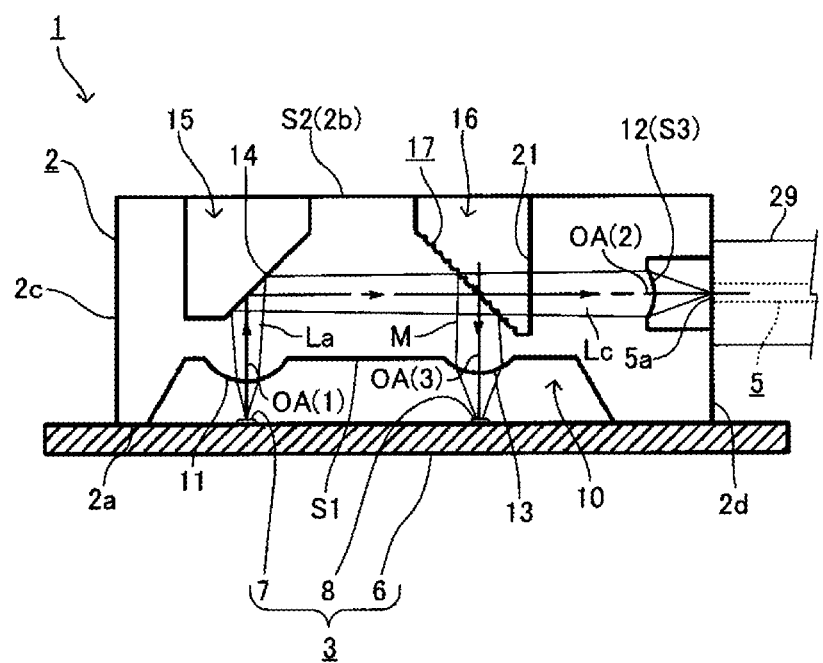
FIG. 23A is a sectional view illustrating a configuration of an optical module according to modification 1 of Embodiment 4.
Figure 23B:
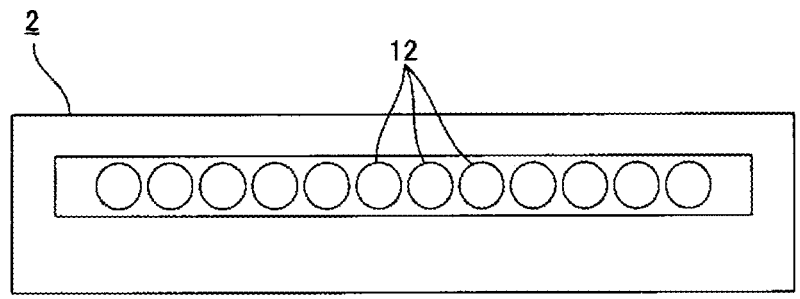
FIG. 23B is a right side view thereof.

For example, as illustrated in the sectional view of FIG. 23A and the right side view of FIG. 23B, non-collimate light similar to the non-collimate light illustrated in FIG. 20 may be applied in optical module 1 of an lens array type having a plurality of first optical surfaces 11, a plurality of second optical surfaces 12 and a plurality of third optical surfaces 13.

It is to be noted that the specific configuration of the present modification is identical to that of the modification of Embodiment 1 (see FIG. 9 to FIG. 12) except for the shape of first optical surface 11, and therefore the description thereof will be omitted.

With the present modification, signal light Lc of each optical transmission member 5 based on laser light La emitted from each of light emitting elements 7 has the spot shape illustrated in FIG. 21A to FIG. 21C. Thus, in comparison with the modification of Embodiment 1, multichannel light transmission performed with monitoring can be further appropriately performed.

(Modification 2)

Figure 24:
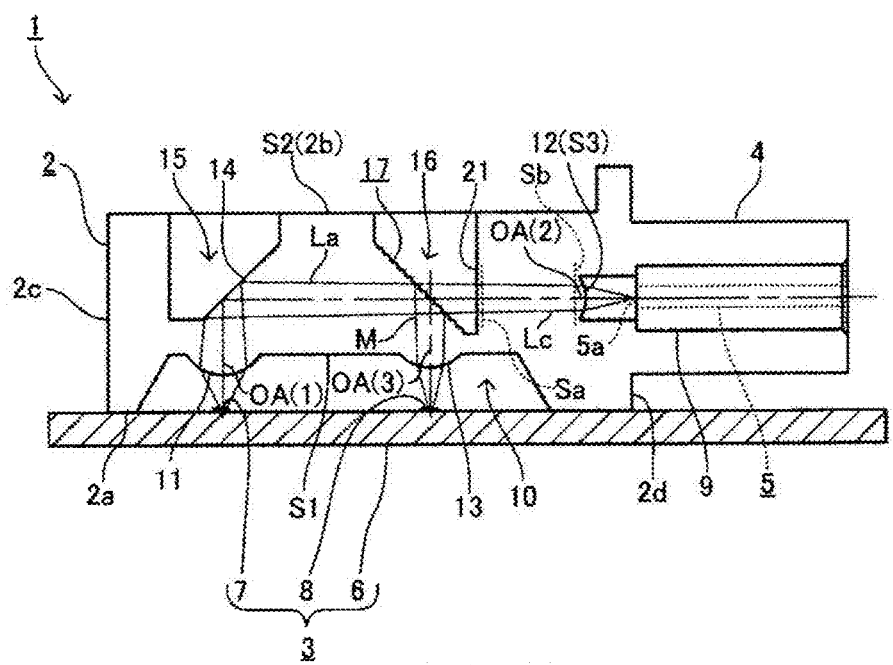
FIG. 24 illustrates a configuration of an optical module according to modification 2 of Embodiment 4.

FIG. 24 illustrates a configuration of an optical module according to modification 2 of Embodiment 4. In addition, as illustrated in FIG. 24, in optical module 1 according to modification 2, laser light La emitted from light emitting element 7 and incident on first optical surface 11 may be converging light (non-collimate light) whose light flux diameter gradually decreases as it travels forward in the travelling direction. Laser light La incident on first optical surface 11 may be set to the converging light whose light flux diameter gradually decreases as it travels forward in the travelling direction by increasing the positive power of first optical surface 11 in Embodiment 1 or the like.

Figure 25A:
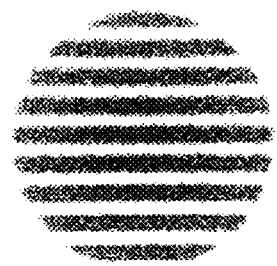
FIG. 25A to FIG. 25C show simulations of variation of the spot shape of signal light at different positions on the light path of the signal light in modification 2 of Embodiment 4.
Figure 25B:
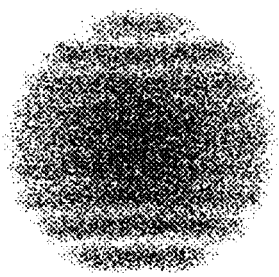
Figure 25C:
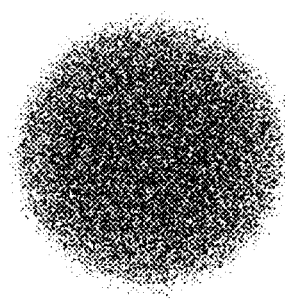

FIG. 25A to FIG. 25C illustrate simulations of the beam spot shape of signal light Lc at different positions on the light path of signal light Lc in modifications 1 and 2. FIG. 25A illustrates a spot shape on provided plane Sa virtually provided at a position immediately after transmission surface 21 on the light path in FIG. 24, FIG. 25B illustrates a spot shape on plane Sb which is virtually provided at a position immediately before second optical surface 12 on the light path in FIG. 24, and FIG. 25C illustrates a spot shape on end surface 5a of optical transmission member 5.

As illustrated in FIG. 25A to FIG. 25C, also in modifications 1 and 2, the spot shape of signal light Lc sectioned in a belt shape at a position immediately after division transmission surface 19 can be finally set to a completely single circle spot on end surface 5a of optical transmission member 5 as with optical module 1 according to Embodiment 1 illustrated in FIG. 21A to FIG. 21C.

As described above, as with the configuration of FIG. 20, optical module 1 according to modifications 1 and 2 can improve the intensity distribution of signal light Lc at end surface 5a of optical transmission member 5, and therefore can further properly perform light transmission performed with monitoring in comparison with Embodiment 1.

(Modification 3)

Figure 26A:
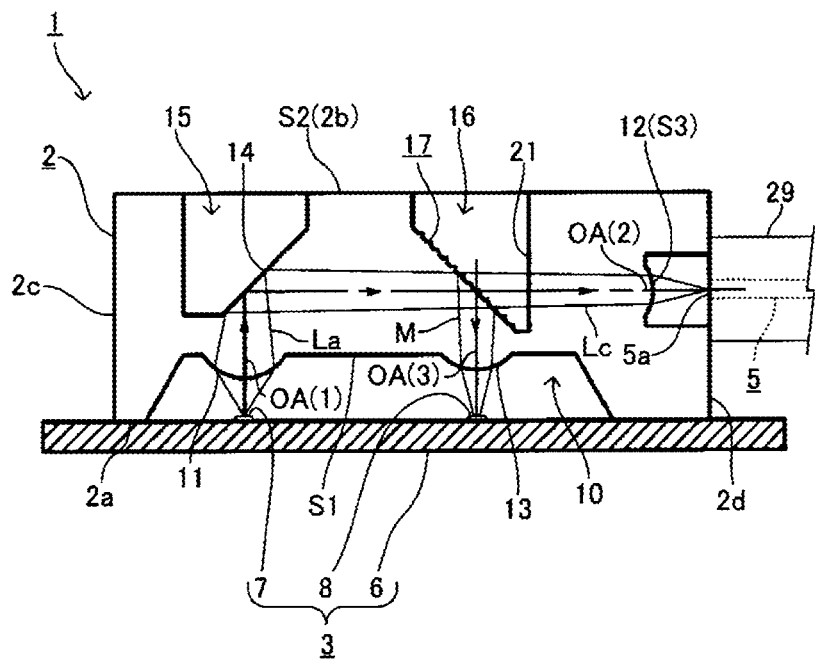
FIG. 26A is a sectional view illustrating a configuration of an optical module according to modification 3 of Embodiment 4.
Figure 26B:
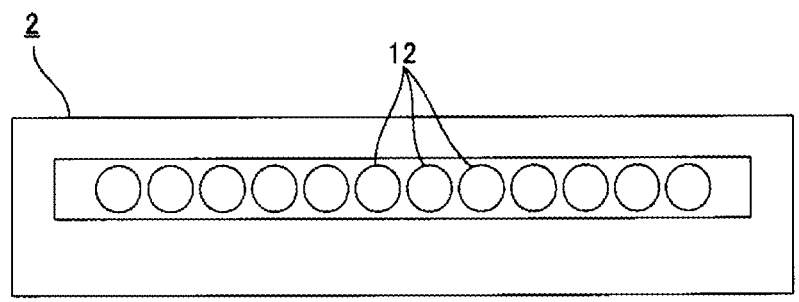
FIG. 26B is a right side view thereof.

FIG. 26A is a sectional view illustrating a configuration of an optical module according to modification 3 of Embodiment 4, and FIG. 26B is a right side view thereof. Further, the non-collimate light (converging light whose diameter is reduced as it advances) described in modification 2 may be adopted in the configuration of a lens array type illustrated in the sectional view of FIG. 26A and the right side view of FIG. 26B.

With the present modification, signal light Lc of each optical transmission member 5 based on laser light La emitted from each of light emitting elements 7 has the spot shape illustrated in FIG. 25A to FIG. 25C. Thus, in comparison with the modification of Embodiment 1, multichannel light transmission performed with monitoring can be further appropriately performed.

(Modification 4)

Figure 27:
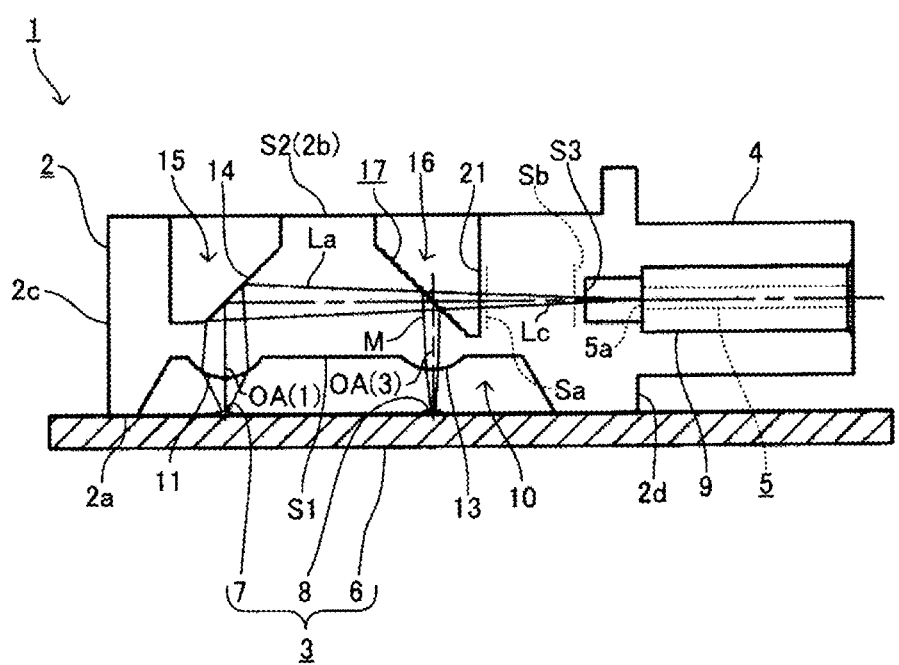
FIG. 27 is a sectional view illustrating a configuration of an optical module according to modification 4 of Embodiment 4.

In addition, since the non-collimate light described in the second modification is effectively converged before the light reaches second optical surface 12, the light is in some situations not required to be converged at one time for the coupling to end surface 5a of optical transmission member 5 at second optical surface 12. In this case, it is not necessary to intentionally apply a large power to second optical surface 12, and therefore the surface shape can be simplified (or can be set to a nearly planar shape). The configuration of the present modification is achieved by developing the above-mentioned approach. FIG. 27 is a sectional view illustrating a configuration of an optical module according to modification 4 of Embodiment 4.

That is, as illustrated in FIG. 27, in the configuration of the present modification, a non-collimate light whose diameter is reduced as it advances is applied as with modification 2, and third surface S3 is formed as a plane having no second optical surface 12.

Figure 28A:
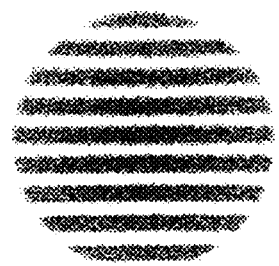
FIG. 28A to FIG. 28C show simulations of variation of the spot shape of signal light at different positions on the light path of the signal light in modification 4 of Embodiment 4.
Figure 28B:
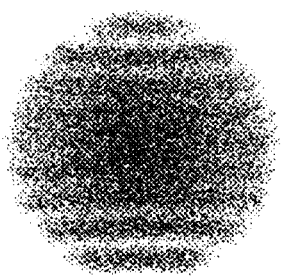
Figure 28C:
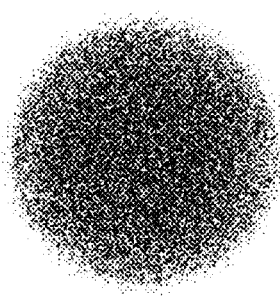

Here, FIG. 28A to FIG. 28C illustrate simulations of the beam spot shape of signal light Lc at different positions on the light path of signal light Lc in the above-mentioned configuration of the present modification. To be more specific, FIG. 28A illustrates a spot shape plane Sa virtually provided at a position immediately after transmission surface 21 on the light path in FIG. 27, FIG. 28B illustrates a spot shape on plane Sb virtually provided at a position immediately before third surface S3 on the light path in FIG. 27, and FIG. 28C illustrates a spot shape on end surface 5a of optical transmission member 5.

As illustrated in FIG. 28A to FIG. 28C, also in the present modification, the spot shape of signal light Lc sectioned in a belt shape at a position immediately after division transmission surface 19 may be finally set to a completely single circle spot on end surface 5a of optical transmission member 5 as in FIG. 21A to FIG. 21C.

With the present modification, since second optical surface 12 is not required, light transmission performed with monitoring can be further properly performed in comparison with Embodiment 1, and cost can be reduced by simplifying the shape.

(Modification 5)

Figure 29A:
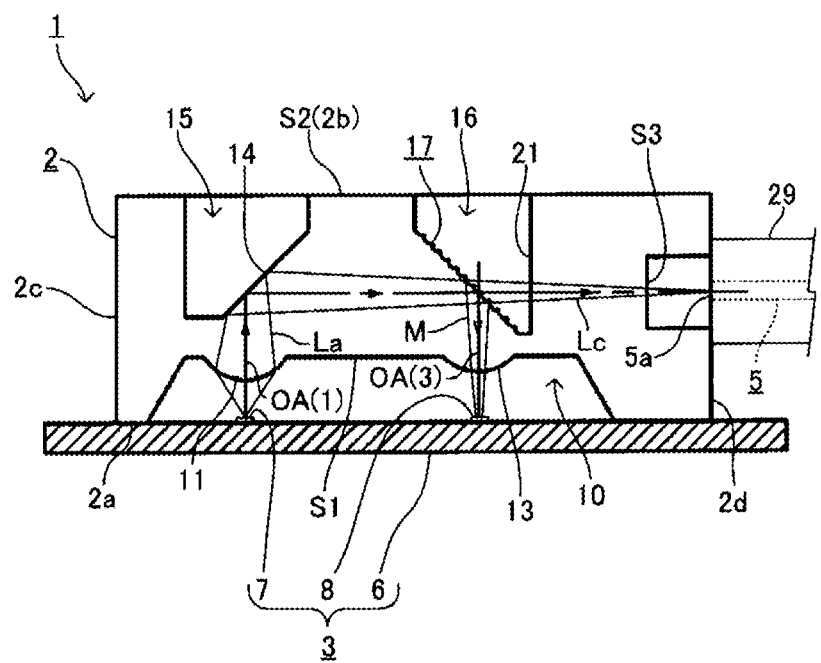
FIG. 29A is a sectional view illustrating a configuration of an optical module according to modification 5 of Embodiment 4.
Figure 29B:
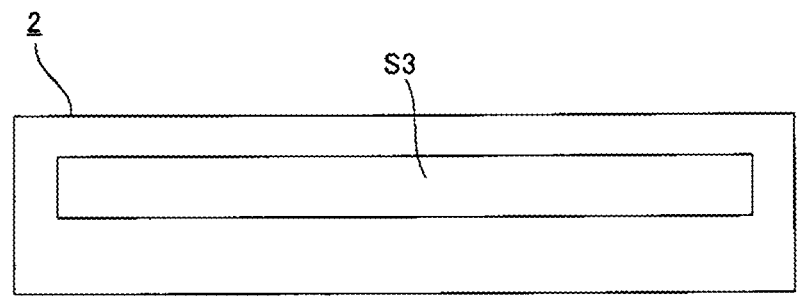
FIG. 29B is a right side view thereof.

FIG. 29A is a sectional view illustrating a configuration of an optical module according to modification 5 of Embodiment 4, and FIG. 29B is a right side view thereof. As illustrated in FIG. 29A and FIG. 29B, optical module 1 according to modification 5 of Embodiment 4 may have a configuration of a lens array type in which second optical surface 12 described in the fourth modification is not provided.

It should be understood by those skilled in the art that various modifications, combinations, sub-combinations and alterations may occur depending on design requirements and other factors in so far as they are within the scope of the appended claims or the equivalents thereof.

For example, the collimate light and the non-collimate light described in the embodiments may be achieved by adjusting the emission angle of laser light La by light emitting element 7 or the like in place of, or in addition to the surface shape of first optical surface 11.

(Modification 6)

The present modification includes light separation part 330 having another configuration as the light separation part.

Figure 30A:
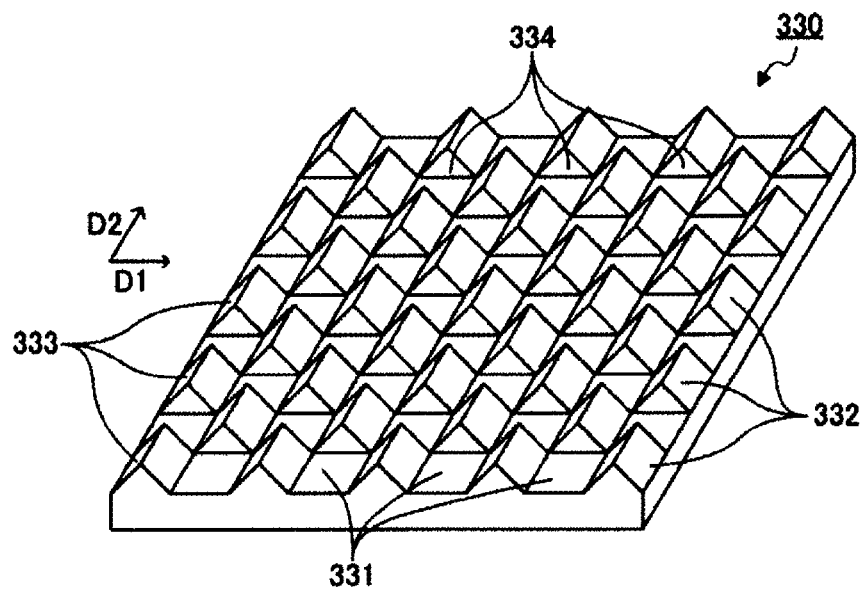
FIG. 30A is a perspective view illustrating another exemplary light separation part.
Figure 30B:
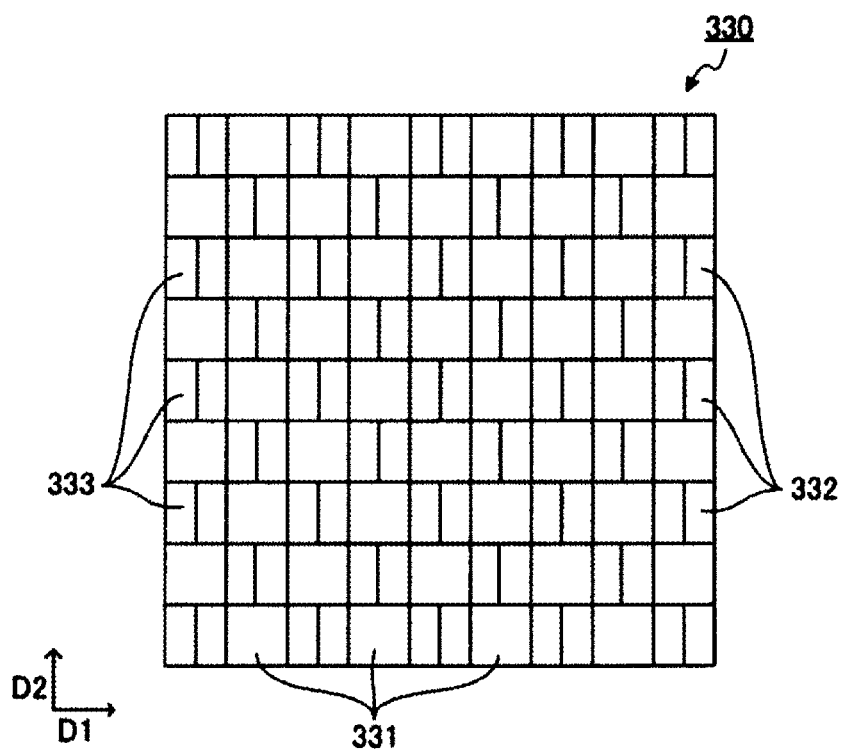
FIG. 30B is a plan view thereof.
Figure 31A:
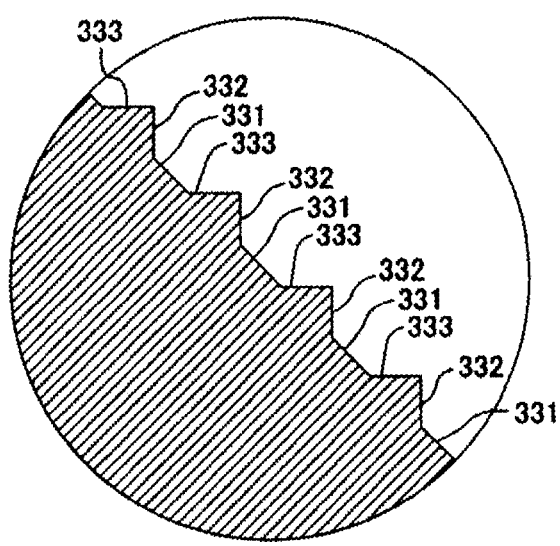
FIG. 31A is a partially enlarged sectional view of the light separation part.
Figure 31B:
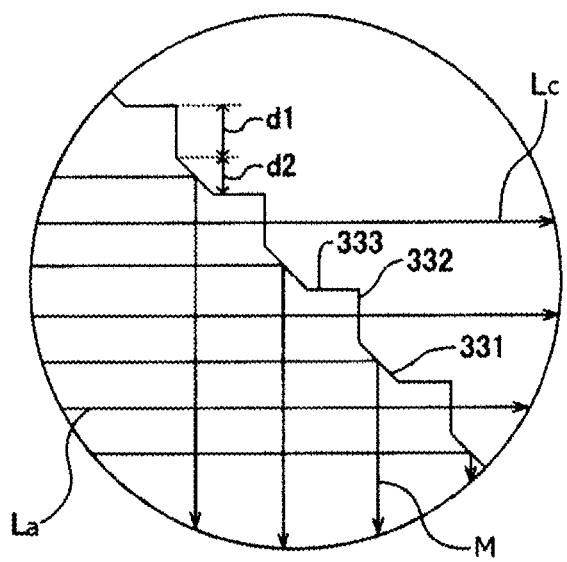
FIG. 31B is a partially enlarged sectional view illustrating the light path of the light separation part.

FIG. 30A to FIG. 31B illustrate a configuration of light separation part 330. FIG. 30A is a perspective view of light separation part 330, and FIG. 30B is a plan view of light separation part 330. FIG. 31A is a partially enlarged sectional view of light separation part 330 having a configuration similar to that illustrated in FIG. 4, and FIG. 31B is a partially enlarged sectional view illustrating a light path of light separation part 330. In FIG. 31B, the hatching of the cross-section of optical receptacle 2 is omitted to illustrate a light path in optical receptacle 2.

As illustrated in FIG. 30A to FIG. 31B, light separation part 330 includes a plurality of division reflection surfaces 331, a plurality of division transmission surfaces 332, a plurality of division step surfaces 333, and a plurality of end surfaces 334. Division reflection surface 331, and division transmission surface 332 and division step surface 333 are alternately disposed in the first direction and the second direction orthogonal to the first direction so as to form a matrix shape. Here, the "first direction" is the inclination direction of division reflection surface 331 described later (see arrow D1 illustrated in FIG. 30A and FIG. 30B). In addition, the "second direction" is a direction along division reflection surface 331 and orthogonal to the first direction (see arrow D2 illustrated in FIG. 30A and FIG. 30B).

Division reflection surface 331 is an inclined surface with respect to the optical axis of light La reflected by reflecting surface 14. Division reflection surface 331 is tilted toward optical transmission member 5 from the top surface to the bottom surface of optical receptacle 2. In the present embodiment, the inclination angle of division reflection surface 331 is 45 degrees to the optical axis of light La reflected by reflecting surface 14. A plurality of division reflection surfaces 331 are disposed on one plane. In addition, division reflection surfaces 331 are disposed in the first direction and the second direction at predetermined intervals. Division transmission surface 332 and division step surface 333 are disposed between division reflection surfaces 331 adjacent to each other in the first direction. On the other hand, division transmission surface 332, division step surface 333 and a pair of end surfaces 334 are disposed between division reflection surfaces 331 adjacent to each other in the second direction. The distances between division reflection surfaces 331 in the first direction and the second direction are not limited. In the present embodiment, the distances between the division reflection surfaces 331 in the first direction and the second direction are equal to each other.

Division transmission surface 332 is a surface which is formed at a position different from division reflection surface 331, and is perpendicular to the optical axis of light La reflected by reflecting surface 14. Division transmission surfaces 332 are disposed in the first direction and the second direction at predetermined intervals. Division transmission surfaces 332 are parallel to each other in the first direction and are disposed on one plane in the second direction.

Division step surface 333 is a surface which is parallel to the optical axis of light La reflected by reflecting surface 14, and connects division reflection surface 331 and division transmission surface 332. Division step surfaces 333 are disposed in the first direction and the second direction at predetermined intervals. Division step surfaces 333 are parallel to each other in the first direction, and disposed on one plane in the second direction.

End surface 334 is a surface which is parallel to the optical axis of light La reflected by reflecting surface 14 and is perpendicular to division transmission surface 332 and division step surface 333. End surface 334 is disposed at both ends of division transmission surface 332 and division step surface 333 in the second direction, and connects the both ends of division transmission surface 332 and division step surface 333 with division reflection surface 331. A plurality of end surfaces 334 are disposed on one plane in the first direction, and are parallel to each other in the second direction.

A ridgeline is formed between division transmission surface 332 and division step surface 333. The ridgelines adjacent to each other in the first direction are parallel to each other. In addition, a plurality of ridgelines adjacent to each other in the second direction are disposed on the same straight line. In the present embodiment, the smaller angle of the angles between division transmission surface 332 and division step surface 333 is 90 degrees. In addition, the smaller angle of the angles between division transmission surface 332 and division reflection surface 331 is 135 degrees. In addition, the smaller angle of the angles between division step surface 333 and division reflection surface 331 is 135 degrees. That is, division transmission surface 332 and division step surface 333 are formed in the same rectangular.

As illustrated in FIG. 31B, light La reflected by reflecting surface 14 is internally incident on division reflection surface 331 at an incident angle greater than the critical angle. Division reflection surface 331 reflects incident light La toward third surface S3 to generate monitor light M. On the other hand, division transmission surface 332 allows light La reflected by reflecting surface 14 to pass therethrough, and generates signal light Lc directed toward end surface 5a of optical transmission member 5. Signal light Lc is emitted to second recess 15. At this time, division transmission surface 332 is a surface perpendicular to light La and therefore signal light Lc is not refracted. It is to be noted that division step surface 333 and end surface 334 are parallel to the incident direction of light La, and therefore light La is not incident on division step surface 333 and end surface 334.

The light quantity ratio of signal light Lc and monitor light M generated at light separation part 330 is not limited. The light quantity ratio of signal light Lc and monitor light M is proportional to the area ratio of division transmission surface 332 and division reflection surface 331 with respect to laser light La incident on light separation part 330. For example, it is assumed that the ratio of dimension d1 of division transmission surface 332 to dimension d2 of division reflection surface 331 in the direction parallel to division transmission surface 332 in the cross-section illustrated in FIG. 31B is 1:1. In this case, signal light Lc of 50% and monitor light M of 50% are generated from the light of 100% incident on light separation part 330.

When division reflection surface 331 and division transmission surface 332 are alternately disposed in the first direction and the second direction in the above-mentioned manner, the entire spot shape of signal light Lc is uniformly sectioned into a matrix pattern by reflecting division transmission surface 332 at a timing immediately after division although not illustrated in the drawings, and thus the influence of the angle intensity distribution of light emitting element 7 is reduced in comparison with the case where the spot shape is sectioned into a lateral striped pattern as illustrated in FIG. 21A, for example.

As described above, in optical receptacle 2 according to the present embodiment, laser light La emitted from light emitting element 7 is reflected by reflecting surface 14 along the surface of semiconductor substrate 6, and is separated into monitor light M and signal light Lc through reflection on division reflection surface 331 and transmission on division transmission surface 332. Monitor light M is emitted from second surface S2 toward detection device 8, and signal light Lc is emitted from third surface S3 toward end surface 5a of optical transmission member 5 without changing the travelling direction. Thus, optical receptacle 2 can set the direction of signal light Lc at end surface 5a of optical transmission member 5 to a direction along semiconductor substrate 6 while acquiring monitor light M for monitoring laser light La emitted from light emitting element 7. In addition, optical receptacle 2 is not easily influenced by the angle intensity distribution of light emitting element 7.

This application is entitled to and claims the benefit of Japanese Patent Application No. 2014-055592 filed on Mar. 18, 2014, the disclosure each of which including the specification, drawings and abstract is incorporated herein by reference in its entirety.

INDUSTRIAL APPLICABILITY

The optical receptacle and the optical module according to the embodiments and so forth of the present invention are suitable for optical communications using an optical transmission member.

REFERENCE SIGNS LIST

1 Optical module
2 Optical receptacle
3 Photoelectric conversion device
4 Optical transmission member attaching portion
5 Optical transmission member
6 Semiconductor substrate
7 Light emitting element
8 Detection device
9 Ferrule
10 First recess
11 First optical surface
12 Second optical surface
13 Third optical surface
14 Reflecting surface
15 Second recess
16 Third recess
17, 330 Light separation part
18, 331 Division reflection surface
19, 332 Division transmission surface
20 Step surface
21 Transmission surface
29 Connector 181 Reflecting surface part
191 Transmission surface part
333 Division step surface
334 End surface
2a Lower end surface
2b Upper end surface
2c Left end surface
2d Right end surface
2e Front end surface
2f Rear end surface
5a End surface
La Collimate light (laser light)
Lc Signal light
M Monitor light
OA optical axis (central axis)
RM Reflection monitor light
S1 First surface
S2 Second surface
S3 Third surface
Sa, Sb Plane

The invention claimed is:

1. An optical receptacle disposed between a photoelectric conversion device and an optical transmission member, the photoelectric conversion device including a light emitting element and a detection device configured to detect monitor light for monitoring light emitted from the light emitting element, the light emitting element and the detection device being mounted on a substrate, the optical receptacle being configured to optically couple the light emitting element and an end surface of the optical transmission member, the optical receptacle comprising:
a first surface including a first optical surface on which light emitted from the light emitting element is incident, and a third optical surface configured to emit the monitor light toward the detection device;
a reflecting surface configured to reflect light incident on the first optical surface in a direction along the substrate;
a light separation part composed of a part of an internal surface of a recess disposed on a light path of light reflected by the reflecting surface, the light separation part being configured to separate the light reflected by the reflecting surface into the monitor light directed toward the third optical surface and signal light directed toward the end surface of the optical transmission member;
a transmission surface composed of a part of the internal surface of the recess, and configured to allow the signal light separated by the light separation part to pass therethrough through an internal space of the recess;
a third surface including a second optical surface configured to emit the signal light passed through the transmission surface toward the end surface of the optical transmission member; and
a reflection monitor light avoiding part disposed on a light path between the light separation part and the detection device, and configured to guide reflection monitor light such that the reflection monitor light does not return to the light emitting element, the reflection monitor light being the monitor light which reaches the detection device and is reflected by a detection surface of the detection device, wherein:
the light separation part includes:
a division reflection surface on which a part of light emitted from the light emitting element and reflected by the reflecting surface is incident, the division reflection surface being divided in a predetermined dividing direction at predetermined intervals and disposed at a second inclination angle to the first surface angle, the division reflection surface being configured to reflect the part of the light incident on the division reflection surface as the monitor light, and
a division transmission surface on which another part of the light of the light emitting element reflected by the reflecting surface is incident, the division transmission surface is disposed and divided at a position where the division reflection surface is not provided, the division transmission surface being configured to allow the other part of the light incident on the division transmission surface to pass therethrough toward the third surface side as the signal light.

2. The optical receptacle according to claim 1, wherein the reflection monitor light avoiding part is the division reflection surface which is set to have the second inclination angle such that an optical axis of the monitor light is tilted to the first surface.

3. The optical receptacle according to claim 1, wherein:
the reflection monitor light avoiding part is:
the division reflection surface which is set to have the second inclination angle such that an optical axis of the monitor light is tilted to the first surface, and
the third optical surface which is set such that a central axis thereof intersects with a normal direction with respect to the first surface.

4. An optical module comprising:
a photoelectric conversion device including a light emitting element and a detection device configured to detect monitor light for monitoring light emitted from the light emitting element, the light emitting element and the detection device being mounted on a substrate; and
the optical receptacle according to claim 1 disposed on the substrate.

5. An optical module comprising:
a photoelectric conversion device including a light emitting element and a detection device configured to detect monitor light for monitoring light emitted from the light emitting element, the light emitting element and the detection device being mounted on a substrate; and
the optical receptacle according to claim 2 disposed on the substrate.

6. An optical module comprising:
a photoelectric conversion device including a light emitting element and a detection device configured to detect monitor light for monitoring light emitted from the light emitting element, the light emitting element and the detection device being mounted on a substrate; and
the optical receptacle according to claim 3 disposed on the substrate.

* * * * *